US005990454A

United States Patent [19]

Westerberg et al.

[11] Patent Number: 5,990,454

[45] Date of Patent: Nov. 23, 1999

[54] LIGHTWAVE OVEN AND METHOD OF COOKING THEREWITH HAVING MULTIPLE COOK MODES AND SEQUENTIAL LAMP OPERATION

[75] Inventors: Eugene R. Westerberg, Palo Alto; Donald W. Pettibone, Cupertino; Gay Winterringer, Menlo Park, all of Calif.

[73] Assignee: Quadlux, Inc., Fremont, Calif.

[21] Appl. No.: 09/060,414

[22] Filed: Apr. 14, 1998

[51] Int. Cl.[6] .............................. A21B 1/14; A21B 2/00; H05B 1/02

[52] U.S. Cl. .......................... 219/411; 219/412; 219/485; 219/492; 219/508; 392/411; 99/331

[58] Field of Search ............................ 219/405, 410–413, 219/446, 396, 492, 485, 509, 508; 99/331; 426/241, 243, 248, 523; 392/411, 416

[56] References Cited

U.S. PATENT DOCUMENTS

| | | | |
|---|---|---|---|
| D. 245,162 | 7/1977 | Zimmer | D15/108 |
| 500,371 | 6/1893 | Brachhausen et al. . | |
| 793,424 | 6/1905 | Custer . | |
| 2,549,619 | 4/1951 | Miskella | 219/411 |
| 2,559,249 | 7/1951 | Hudson | 219/35 |
| 2,767,297 | 10/1956 | Benson | 219/35 |

(List continued on next page.)

FOREIGN PATENT DOCUMENTS

| | | |
|---|---|---|
| 0 023 724 | 2/1981 | European Pat. Off. . |
| 0 215 617 | 9/1986 | European Pat. Off. . |
| 0 332 081 | 9/1989 | European Pat. Off. . |
| 0 455 169 A2 | 6/1991 | European Pat. Off. . |
| 25 46 106 | 4/1977 | Germany . |
| 35 03 648 | 4/1986 | Germany . |
| 32 42 804 A1 | 6/1986 | Germany . |
| 52-112146 | 9/1977 | Japan . |
| 57-60007 | 4/1982 | Japan . |
| 57-70323 | 4/1982 | Japan . |
| 59-1930 | 1/1984 | Japan . |
| 59-47302 | 3/1984 | Japan . |
| 59-210228 | 11/1984 | Japan . |

(List continued on next page.)

OTHER PUBLICATIONS

Fostoria Corp., "Heat Processing with Infrared," Feb. 1962, pp. 1–7.

Summer, W. Dr., "Ultra–Violet and Infra–Red Engineering," 1962, pp. 102–112.

Beggs, E.W., "Quicker Drying With Lamps," Jul. 1939, vol. 97, No. 7, pp. 88–89.

Harold McGee, Book, "On Food and Cooking," Charles Schribner's Sons, New York, 1984, chapter 14, pp. 608–624.

Hidemi Sato et al., "Effects of Radiative Characteristics of Heaters on Crust Formation And Coloring Processes of Food Surface," Nippon Shokuhin Kagaku Kaishi, Vol. 42, No. 9, pp. 643–648, (1995).

*Primary Examiner*—Joseph Pelham
*Attorney, Agent, or Firm*—Limbach & Limbach L.L.P.

[57] ABSTRACT

An lightwave oven and method of cooking therewith for cooking food with radiant energy in the visible, near-visible and infrared ranges of the electromagnetic spectrum from a first plurality of high power lamps positioned above the food and a second plurality of high power lamps positioned below the food. The first plurality of lamps are sequentially operated at a first average power level by applying power thereto in a staggered manner so that not all of the first plurality of lamps are on at the same time, and the second plurality of lamps are sequentially operated at a second average power level by applying power thereto in a staggered manner so that not all of the second plurality of lamps are on at the same time. The stagger can be varied to change the time average power level of the first and/or second pluralities of lamps without adversely affecting the spectral outputs thereof. The first and second pluralities of lamps can be operated in one of several different modes. In one mode, the first and second pluralities of lamps are sequentially operated simultaneously. In another mode, the first plurality of lamps is sequentially operated while the second plurality of lamps are turned off. In yet another mode, the second plurality of lamps is sequentially operated while the first plurality of lamps are turned off.

22 Claims, 20 Drawing Sheets

U.S. PATENT DOCUMENTS

| | | | |
|---|---|---|---|
| 2,824,943 | 2/1958 | Laughlin | 35/315 |
| 2,864,932 | 12/1958 | Forrer | 219/35 |
| 2,924,695 | 1/1960 | Atkeson | 219/34 |
| 2,939,383 | 6/1960 | Kanaga | 99/327 |
| 2,980,544 | 4/1961 | Mills | 99/229 |
| 3,003,409 | 10/1961 | Mills | 99/331 |
| 3,033,968 | 11/1962 | Julie | 219/20 |
| 3,037,443 | 6/1962 | Newkirk et al. | 99/332 |
| 3,119,000 | 1/1964 | Losch et al. | 219/19 |
| 3,131,280 | 4/1964 | Brussel | 219/411 |
| 3,249,741 | 5/1966 | Mills | 219/388 |
| 3,280,720 | 10/1966 | Kohn | 99/238.5 |
| 3,304,406 | 2/1967 | King | 219/411 |
| 3,313,917 | 4/1967 | Ditzler et al. | 219/400 |
| 3,326,962 | 6/1967 | Martino et al. | 99/328 |
| 3,342,977 | 9/1967 | Anderson | 219/548 |
| 3,364,338 | 1/1968 | Holtkamp | 219/398 |
| 3,414,709 | 12/1968 | Tricault | 219/411 |
| 3,427,435 | 2/1969 | Webb | 219/411 |
| 3,448,678 | 6/1969 | Burstein | 99/386 |
| 3,470,942 | 10/1969 | Fukada et al. | 219/492 |
| 3,559,564 | 2/1971 | Turner et al. | 99/332 |
| 3,569,656 | 3/1971 | White et al. | 219/10.55 B |
| 3,586,823 | 6/1971 | Schier | 219/347 |
| 3,601,582 | 8/1971 | Boisfleury | 219/388 |
| 3,621,200 | 11/1971 | Watts, Jr. | 219/377 |
| 3,626,154 | 12/1971 | Reed | 219/411 |
| 3,626,155 | 12/1971 | Joeckel | 219/411 |
| 3,648,010 | 3/1972 | Schier | 219/214 |
| 3,660,637 | 5/1972 | Grove | 219/413 |
| 3,666,921 | 5/1972 | Shevlin | 219/492 |
| 3,682,643 | 8/1972 | Foster | 219/405 |
| 3,684,860 | 8/1972 | Snyder | 219/413 |
| 3,688,084 | 8/1972 | Charneski | 219/537 |
| 3,693,538 | 9/1972 | Snyder | 99/447 |
| 3,699,307 | 10/1972 | Malkin | 219/492 |
| 3,713,846 | 1/1973 | Turner et al. | 99/217 |
| 3,719,789 | 3/1973 | Harnden, Jr. . | |
| 3,751,632 | 8/1973 | Kauranen | 219/492 |
| 3,828,163 | 8/1974 | Amagami et al. | 219/413 |
| 3,836,751 | 9/1974 | Anderson | 219/411 |
| 3,847,069 | 11/1974 | Guibert | 219/388 |
| 3,870,806 | 3/1975 | Capossela et al. | 426/221 |
| 3,882,255 | 5/1975 | Gorham, Jr. et al. | 426/235 |
| 3,935,807 | 2/1976 | Main | 99/352 |
| 3,944,807 | 3/1976 | Frantti et al. . | |
| 3,959,620 | 5/1976 | Stephen, Jr. . | |
| 4,036,151 | 7/1977 | Shin | 108/20 |
| 4,092,512 | 5/1978 | Suzuki et al. | 219/10.55 |
| 4,101,759 | 7/1978 | Anthony | 219/405 |
| 4,121,078 | 10/1978 | Takano et al. | 219/10.55 |
| 4,164,591 | 8/1979 | Ahlgren et al. | 426/523 |
| 4,164,643 | 8/1979 | Peart et al. | 219/411 |
| 4,191,881 | 3/1980 | Ahlgren et al. | 219/388 |
| 4,210,794 | 7/1980 | Oguri | 219/10.55 |
| 4,225,767 | 9/1980 | Hatanaka et al. | 219/10.55 |
| 4,238,669 | 12/1980 | Huntley | 219/405 |
| 4,238,995 | 12/1980 | Polster | 219/411 |
| 4,244,284 | 1/1981 | Flavan et al. | 99/327 |
| 4,245,148 | 1/1981 | Glaske et al. | 219/492 |
| 4,276,465 | 6/1981 | Flavio | 219/388 |
| 4,323,773 | 4/1982 | Carpenter | 235/473 |
| 4,343,985 | 8/1982 | Wilson et al. | 219/214 |
| 4,360,726 | 11/1982 | Haden | 219/494 |
| 4,363,957 | 12/1982 | Tachikawa et al. | 219/497 |
| 4,367,388 | 1/1983 | Ishihara et al. | 219/10.55 B |
| 4,374,319 | 2/1983 | Guibert | 219/411 |
| 4,379,964 | 4/1983 | Kanazawa et al. | 219/492 |
| 4,396,817 | 8/1983 | Eck et al. | 426/523 |
| 4,401,884 | 8/1983 | Kusunoki et al. | 426/243 |
| 4,410,779 | 10/1983 | Weiss | 219/10.55 |
| 4,421,015 | 12/1983 | Masters et al. | 99/400 |
| 4,421,974 | 12/1983 | Oota et al. | 219/492 |
| 4,441,015 | 4/1984 | Eichelberger et al. | 219/411 |
| 4,455,479 | 6/1984 | Itoh et al. | 219/405 |
| 4,462,307 | 7/1984 | Wells | 99/386 |
| 4,463,238 | 7/1984 | Tanabe | 219/10.55 B |
| 4,468,260 | 8/1984 | Hiramoto | 219/411 |
| 4,481,405 | 11/1984 | Malick | 219/405 |
| 4,483,631 | 11/1984 | Kydd | 364/557 |
| 4,486,639 | 12/1984 | Mittelsteadt | 219/10.55 B |
| 4,493,960 | 1/1985 | Mittelsteadt et al. . | |
| 4,501,944 | 2/1985 | Matsushima | 219/10.55 |
| 4,506,652 | 3/1985 | Baker | 219/388 |
| 4,508,960 | 4/1985 | Arai | 219/388 |
| 4,511,788 | 4/1985 | Arai et al. | 219/405 |
| 4,516,486 | 5/1985 | Burkhart | 99/388 |
| 4,554,437 | 11/1985 | Wagner et al. | 219/388 |
| 4,561,907 | 12/1985 | Raicu | 148/187 |
| 4,565,704 | 1/1986 | Dagerskog | 426/233 |
| 4,575,616 | 3/1986 | Bergendal | 219/405 |
| 4,588,923 | 5/1986 | Hoegler et al. | 313/579 |
| 4,598,194 | 7/1986 | Halberstadt et al. | 219/464 |
| 4,601,004 | 7/1986 | Holt et al. | 364/557 |
| 4,663,557 | 5/1987 | Martin, Jr. et al. | 313/112 |
| 4,680,451 | 7/1987 | Gat et al. . | |
| 4,687,895 | 8/1987 | Chitre et al. | 219/10.55 |
| 4,692,597 | 9/1987 | Tsuda et al. | 219/492 |
| 4,700,051 | 10/1987 | Goessler et al. | 219/464 |
| 4,701,663 | 10/1987 | Kawakatsu et al. | 313/112 |
| 4,721,877 | 1/1988 | Kawakatsu et al. | 131/111 |
| 4,728,763 | 3/1988 | Bell et al. | 219/10.55 |
| 4,731,251 | 3/1988 | Javanovic | 219/405 X |
| 4,734,562 | 3/1988 | Amano et al. | 219/413 |
| 4,761,529 | 8/1988 | Tsisios | 219/10.55 B |
| 4,771,154 | 9/1988 | Bell et al. | 219/405 |
| 4,808,798 | 2/1989 | Goessler et al. | 219/464 |
| 4,816,635 | 3/1989 | Edamura | 219/10.55 |
| 4,836,138 | 6/1989 | Robinson et al. | 118/666 |
| 4,871,559 | 10/1989 | Dunn et al. | 426/248 |
| 4,894,518 | 1/1990 | Ishikawa | 219/413 |
| 4,910,942 | 3/1990 | Dunn et al. | 53/425 |
| 4,949,005 | 8/1990 | Parham et al. | 313/112 |
| 4,960,977 | 10/1990 | Alden | 219/388 |
| 4,976,194 | 12/1990 | Kelterborn et al. | 99/328 |
| 4,983,001 | 1/1991 | Haginda et al. | 350/1.6 |
| 4,999,468 | 3/1991 | Fadel | 219/10.55 B |
| 5,034,235 | 7/1991 | Dunn et al. | 426/238 |
| 5,036,179 | 7/1991 | Westerberg et al. | 219/411 |
| 5,038,395 | 8/1991 | Lenski | 392/420 |
| 5,039,535 | 8/1991 | Lang et al. | 426/233 |
| 5,097,112 | 3/1992 | Kanaya et al. | 219/411 |
| 5,108,792 | 4/1992 | Anderson et al. | 118/725 |
| 5,134,263 | 7/1992 | Smith et al. | 219/10.55 |
| 5,138,219 | 8/1992 | Krisl et al. | 313/112 |
| 5,147,068 | 9/1992 | Wright | 221/9 |
| 5,157,239 | 10/1992 | Kanaya et al. | 219/411 |
| 5,164,161 | 11/1992 | Feathers et al. | 422/109 |
| 5,171,974 | 12/1992 | Koether et al. | 219/506 |
| 5,179,264 | 1/1993 | Sheridan et al. | 219/497 |
| 5,182,439 | 1/1993 | Burkett et al. | 219/492 |
| 5,183,997 | 2/1993 | Lotz . | |
| 5,285,041 | 2/1994 | Wright . | |
| 5,308,161 | 5/1994 | Stein . | |
| 5,315,092 | 5/1994 | Takahashi et al. . | |
| 5,317,130 | 5/1994 | Burkett et al. | 219/492 |
| 5,319,717 | 6/1994 | Tazawa | 219/705 |
| 5,352,865 | 10/1994 | Burkett et al. | 219/492 |
| 5,373,778 | 12/1994 | Moreth | 99/421 |
| 5,378,872 | 1/1995 | Jovanovic | 210/405 |
| 5,382,441 | 1/1995 | Lentz et al. | 436/411 |
| 5,390,588 | 2/1995 | Krasznai et al. | 99/389 |

| | | | |
|---|---|---|---|
| 5,396,047 | 3/1995 | Schilling et al. | 219/446 |
| 5,404,420 | 4/1995 | Song | 392/416 |
| 5,420,401 | 5/1995 | Jacquault et al. . | |
| 5,422,460 | 6/1995 | Bralia et al. . | |
| 5,471,914 | 12/1995 | Krasznai et al. | 99/389 |
| 5,478,986 | 12/1995 | Westerberg | 219/411 |
| 5,517,005 | 5/1996 | Westerberg | 219/405 |
| 5,534,679 | 7/1996 | Beaver, II et al. . | |
| 5,560,285 | 10/1996 | Moreth | 99/421 |
| 5,567,459 | 10/1996 | Gonzalez-Hernandez et al. | 426/241 |
| 5,620,624 | 4/1997 | Westerburg | 219/411 |
| 5,665,259 | 9/1997 | Westerberg | 219/411 |
| 5,674,421 | 10/1997 | Beaver, II et al. | 219/385 |
| 5,695,668 | 12/1997 | Boddy | 219/396 |
| 5,695,669 | 12/1997 | Westerberg | 219/411 |
| 5,712,464 | 1/1998 | Westerberg | 219/411 |
| 5,726,423 | 3/1998 | Westerberg et al. | 219/411 |
| 5,736,713 | 4/1998 | Westerberg | 219/411 |
| 5,786,569 | 7/1998 | Westerberg | 219/411 |

FOREIGN PATENT DOCUMENTS

| | | |
|---|---|---|
| 60-37116 | 2/1985 | Japan . |
| 60-69920 | 5/1985 | Japan . |
| 60-167932 | 11/1985 | Japan . |
| 60-245933 | 12/1985 | Japan . |
| 63-34913 | 3/1988 | Japan . |
| 63-46720 | 3/1988 | Japan . |
| 63-49405 | 4/1988 | Japan . |
| 1-154483 | 6/1989 | Japan . |
| 1-315982 | 12/1989 | Japan . |
| 2-89921 | 3/1990 | Japan . |
| 4-080523 | 3/1992 | Japan . |
| 4-361714 | 12/1992 | Japan . |
| 88-717 | 4/1985 | Rep. of Korea . |
| 569 419 | 11/1975 | Switzerland . |
| 1155223 | 5/1985 | U.S.S.R. . |
| 1215651 | 3/1986 | U.S.S.R. . |
| 839551 | 6/1960 | United Kingdom . |
| 1273023 | 5/1972 | United Kingdom . |
| 2132060 | 8/1983 | United Kingdom . |
| 2147788 | 5/1985 | United Kingdom . |
| 2152790 | 8/1985 | United Kingdom . |
| 2180637 | 4/1987 | United Kingdom . |
| 2245136 | 1/1992 | United Kingdom . |
| WO 88/03369 | 5/1988 | WIPO . |
| WO 94/10857 | 5/1994 | WIPO . |
| WO 95/12962 | 5/1995 | WIPO . |

LIGHTWAVE OVEN AND METHOD OF COOKING THEREWITH HAVING MULTIPLE COOK MODES AND SEQUENTIAL LAMP OPERATION

FIELD OF THE INVENTION

This invention relates to the field of cooking ovens. More particularly, this invention relates to an improved lightwave oven and method of cooking therewith with radiant energy in infrared, near-visible and visible ranges of the electromagnetic spectrum.

BACKGROUND OF THE INVENTION

Ovens for cooking and baking food have been known and used for thousands of years. Basically, oven types can be categorized in four cooking forms; conduction cooking, convection cooking, infrared radiation cooking and microwave radiation cooking.

There are subtle differences between cooking and baking. Cooking just requires the heating of the food. Baking of a product from a dough, such as bread, cake, crust, or pastry, requires not only heating of the product throughout but also chemical reactions coupled with driving the water from the dough in a predetermined fashion to achieve the correct consistency of the final product and finally browning the outside. Following a recipe when baking is very important. An attempt to decrease the baking time in a conventional oven by increasing the temperature results in a damaged or destroyed product.

In general, there are problems when one wants to cook or bake foodstuffs with high-quality results in the shortest times. Conduction and convection provide the necessary quality, but both are inherently slow energy transfer methods. Long-wave infrared radiation can provide faster heating rates, but it only heats the surface area of most foodstuffs, leaving the internal heat energy to be transferred by much slower conduction. Microwave radiation heats the foodstuff very quickly in depth, but during baking the loss of water near the surface stops the heating process before any satisfactory browning occurs. Consequently, microwave ovens cannot produce quality baked foodstuffs, such as bread.

Radiant cooking methods can be classified by the manner in which the radiation interacts with the foodstuff molecules. For example, starting with the longest wavelengths for cooking, the microwave region, most of the heating occurs because the radiant energy couples into the bipolar water molecules causing them to rotate. Viscous coupling between water molecules converts this rotational energy into thermal energy, thereby heating the food. Decreasing the wavelength to the long-wave infrared regime, the molecules and their component atoms resonantly absorb the energy in well-defined excitation bands. This is mainly a vibrational energy absorption process. In the shortwave infrared region of the spectrum, the main part of the absorption is due to higher frequency coupling to the vibrational modes. In the visible region, the principal absorption mechanism is excitation of the electrons that couple the atoms to form the molecules. These interactions are easily discerned in the visible band of the spectra, where they are identified as "color" absorptions. Finally, in the ultraviolet, the wavelength is short enough, and the energy of the radiation is sufficient to actually remove the electrons from their component atoms, thereby creating ionized states and breaking chemical bonds. This short wavelength, while it finds uses in sterilization techniques, probably has little use in foodstuff heating, because it promotes adverse chemical reactions and destroys food molecules.

Lightwave ovens are capable of cooking and baking food products in times much shorter than conventional ovens. This cooking speed is attributable to the range of wavelengths and power levels that are used.

There is no precise definition for the visible, near-visible and infrared ranges of wavelengths because the perceptive ranges of each human eye is different. Scientific definitions of the "visible" light range, however, typically encompass the range of about 0.39 $\mu$m to 0.77 $\mu$m. The term "near-visible" has been coined for infrared radiation that has wavelengths longer than the visible range, but less than the water absorption cut-off at about 1.35 $\mu$m. The term "infrared" refers to wavelengths greater than about 1.35 $\mu$m. For the purposes of this disclosure, the visible region includes wavelengths between about 0.39 $\mu$m and 0.77 $\mu$m, the near-visible region includes wavelengths between about 0.77 $\mu$m and 1.35 $\mu$m, and the infrared region includes wavelengths greater than about 1.35 $\mu$m.

Typically, wavelengths in the visible range (0.39 to 0.77 $\mu$m) and the near-visible range (0.77 to 01.35 $\mu$m) have fairly deep penetration in most foodstuffs. This range of deep penetration is mainly governed by the absorption properties of water. The characteristic penetration distance for water varies from about 50 meters in the visible to less than about 1 mm at 1.35 microns. Several other factors modify this basic absorption penetration. In the visible region electronic absorption of the food molecules reduces the penetration distance substantially, while scattering in the food product can be a strong factor throughout the region of deep penetration. Measurements show that the typical average penetration distances for light in the visible and near-visible region of the spectrum varies from 2–4 mm for meats to as deep as 10 mm in some baked goods and liquids like non-fat milk.

The region of deep penetration allows the radiant power density that impinges on the food to be increased, because the energy is deposited in a fairly thick region near the surface of the food, and the energy is essentially deposited in a large volume, so that the temperature of the food at the surface does not increase rapidly. Consequently the radiation in the visible and near-visible regions does not contribute greatly to the exterior surface browning.

In the region above 1.35 $\mu$m (infrared region), the penetration distance decreases substantially to fractions of a millimeter, and for certain absorption peaks down to 0.001 mm. The power in this region is absorbed in such a small depth that the temperature rises rapidly, driving the water out and forming a crust. With no water to evaporate and cool the surface the temperature can climb quickly to 300° F. This is the approximate temperature where the set of browning reactions (Maillard reactions) are initiated. As the temperature is rapidly pushed even higher to above 400° F. the point is reached where the surface starts to burn.

It is the balance between the deep penetration wavelengths (0.39 to 1.35 $\mu$m) and the shallow penetration wavelengths (1.35 $\mu$m and greater) that allows the power density at the surface of the food to be increased in the lightwave oven, to cook the food rapidly with the shorter wavelengths and to brown the food with the longer infrared so that a high-quality product is produced. Conventional ovens do not have the shorter wavelength components of radiant energy. The resulting shallower penetration means that increasing the radiant power in such an oven only heats the food surface faster, prematurely browning the food before its interior gets hot.

It should be noted that the penetration depth is not uniform across the deeply penetrating region of the spectrum. Even though water shows a very deep penetration for visible radiation, i.e., many meters, the electronic absorptions of the food macromolecules generally increase in the visible region. The added effect of scattering near the blue end (0.39 μm) of the visible region reduces the penetration even further. However, there is little real loss in the overall average penetration because very little energy resides in the blue end of the blackbody spectrum.

Conventional ovens operate with radiant power densities as high as about 0.3 W/cm$^2$ (i.e. at 400° F.). The cooking speeds of conventional ovens cannot be appreciably increased simply by increasing the cooking temperature, because increased cooking temperatures drive water off the food surface and cause browning and searing of the food surface before the food's interior has been brought up to the proper temperature. In contrast, lightwave ovens have been operated from approximately 0.8 to 5 W/cm$^2$ of visible, near-visible and infrared radiation, which results in greatly enhanced cooking speeds. The lightwave oven energy penetrates deeper into the food than the radiant energy of a conventional oven, thus cooking the food interior faster. Therefore, higher power densities can be used in a lightwave oven to cook food faster with excellent quality. For example, at about 0.7 to 1.3 W/cm$^2$, the following cooking speeds have been obtained using a lightwave oven:

| Food | Cook Time |
|---|---|
| pizza | 4 minutes |
| steaks | 4 minutes |
| biscuits | 7 minutes |
| cookies | 11 minutes |
| vegetables (asparagus) | 4 minutes |

For high-quality cooking and baking, the applicants have found that a good balance ratio between the deeply penetrating and the surface heating portions of the impinging radiant energy is about 50:50, i.e., Power(0.39 to 1.35 μm)/Power(1.35 μm and greater)≈1. Ratios higher than this value can be used, and are useful in cooking especially thick food items, but radiation sources with these high ratios are difficult and expensive to obtain. Fast cooking can be accomplished with a ratio substantially below 1, and it has been shown that enhanced cooking and baking can be achieved with ratios down to about 0.5 for most foods, and lower for thin foods, e.g., pizza and foods with a large portion of water, e.g., meats. Generally the surface power densities must be decreased with decreasing power ratio so that the slower speed of heat conduction can heat the interior of the food before the outside burns. It should be remembered that it is generally the burning of the outside surface that sets the bounds for maximum power density that can be used for cooking. If the power ratio is reduced below about 0.3, the power densities that can be used are comparable with conventional cooking and no speed advantage results.

If blackbody sources are used to supply the radiant power, the power ratio can be translated into effective color temperatures, peak intensities, and visible component percentages. For example, to obtain a power ratio of about 1, it can be calculated that the corresponding blackbody would have a temperature of 3000° K, with a peak intensity at 0.966 μm and with 12% of the radiation in the full visible range of 0.39 to 0.77 μm. Tungsten halogen quartz bulbs have spectral characteristics that follow the blackbody radiation curves fairly closely. Commercially available tungsten halogen bulbs have successfully been used with color temperatures as high as 3400° K. Unfortunately, the lifetime of such sources falls dramatically at high color temperatures (at temperatures above 3200° K it is generally less that 100 hours). It has been determined that a good compromise in bulb lifetime and cooking speed can be obtained for tungsten halogen bulbs operated at about 2900–3000° K. As the color temperature of the bulb is reduced and more shallow-penetrating infrared is produced, the cooking and baking speeds are diminished for quality product. For most foods there is a discernible speed advantage down to about 2500° K (peak at about 1.2 μm; visible component of about 5.5%) and for some foods there is an advantage at even lower color temperatures. In the region of 2100° K the speed advantage vanishes for virtually all foods that have been tried.

For rectangular-shaped commercial lightwave ovens using polished, high-purity aluminum reflective walls, it has been determined that about 4 kilowatts of lamp power is necessary for a lightwave oven to have a reasonable cooking speed advantage over a conventional oven. Four kilowatts of lamp power can operate four commercially available tungsten halogen lamps, at a color temperature of about 3000° K, to produce a power density of about 0.6–1.0 W/cm$^2$ inside the oven cavity. This power density has been considered near the minimum value necessary for the lightwave oven to clearly outperform a conventional oven. Such commercial lightwave ovens can have lamps both above and below the cooking surface so that the foodstuff on the cooking surface is cooked relatively evenly.

One problem with lightwave ovens is that foods with different shapes and colors cook differently. Therefore, some foods require certain surfaces thereof to receive more lightwave energy than others to result in an evenly cooked and properly browned foodstuff. However, lightwave ovens designed to provide maximum uniformity of illumination in the oven cavity cannot provide adequate custom illumination for selected foodstuff surfaces.

Another problem with lightwave ovens is that they require significant electrical current to operate all of the lamps at the proper color temperature. However, a typical home kitchen outlet can only supply 15 amps of electrical current, which is sufficient to operate only two commercially available 1 KW tungsten halogen lamps at color temperatures of about 2900° K. Without rotating the foodstuff, two elongated lamps cannot efficiently and evenly irradiate a large enough cooking region. A lightwave oven cavity designed for typical home kitchen use needs to have a cooking region size that is significantly larger than that which can be evenly and efficiently covered by only two elongated lamps.

Still another problem with lightwave ovens is that it is not easy to gradually reduce the lightwave cooking power density in the oven cavity, for example to prevent premature browning of the foodstuff surface. In conventional ovens, the voltage to the cooking element can be reduced to reduce the cooking temperature. However, if the operating power of the lightwave oven lamps is reduced, thus reducing the color temperature of lamps, then the spectral output of the lamps is shifted toward the infrared, leaving insufficient amounts of visible and near-visible light to properly cook the interior of the food at the reduced power densities.

Lastly, as stated above, the cooking times for foods in a lightwave oven depend largely on the food's color and shape. Therefore, the lightwave oven cooking time does not directly correlate to conventional oven recipes. Because lightwave oven technology is relatively new, most people using a lightwave oven for the first time will have to use trial and error to determine how best to cook foods that have traditionally been cooked in a conventional oven.

There is a need for a lightwave oven and method of cooking therewith that can evenly and efficiently irradiate a cooking region that is far larger than can be covered by two lamps, yet operate on the limited electrical power typically available in a home kitchen. There is also a need for such an oven and method to selectively increase and decrease the lightwave power density for certain foodstuff surfaces without adversely affecting the energy spectrum of the lamps or without prematurely browning the foodstuff surfaces. Such an oven and method should also provide an easy conversion from cooking recipes for conventional ovens to cooking recipes in a lightwave oven.

SUMMARY OF THE INVENTION

It is an object of the present invention to provide a lightwave oven that operates with commercially available tungsten-halogen quartz lamps using a standard kitchen 120 VAC, 15 amp power outlet, and to provide cooking methods that enhance the quality of cooked foodstuffs while minimizing the cooking time thereof.

It is yet another object of the present invention to provide a means for lowering the average power density inside the oven without adversely compromising the spectral output of the lamps.

It is yet another object of the present invention to provide different modes of lamp operation to selectively change the irradiation of certain food surfaces.

It is yet another object of the present invention to provide a means of translating conventional oven recipes to lightwave oven recipes.

Accordingly, one aspect of the present invention is a method of cooking food in a lightwave oven having a cooking region and a first plurality of high power lamps positioned above the cooking region and a second plurality of high power lamps positioned below the cooking region providing radiant energy in the electromagnetic spectrum including the infrared, near-visible and visible ranges. The method includes the step of sequentially operating one of the first and second pluralities of lamps at a first average power level by applying power thereto in a staggered manner so that not all of the lamps of the one plurality of lamps are on at the same time.

Another aspect of the present invention is a lightwave oven that includes an oven cavity housing enclosing a cooking region therein, a first plurality and a second plurality of high power lamps that provide radiant energy in the visible, near-visible and infrared ranges of the electromagnetic spectrum, and a controller. The first plurality of lamps are positioned above the cooking region and the second plurality of lamps are positioned below the cooking region. The controller sequentially operates the first plurality of lamps at a first average power level by applying power thereto in a staggered manner so that not all of the first plurality of lamps are on at the same time, and the controller sequentially operates the second plurality of lamps at a second average power level by applying power thereto in a staggered manner so that not all of the second plurality of lamps are on at the same time.

Other objects and features of the present invention will become apparent by a review of the specification, claims and appended figures.

DETAILED DESCRIPTION OF THE PREFERRED EMBODIMENT

The present invention is a lightwave oven and method of cooking therewith that sequentially operates the lamps thereof, selectively varies energy intensity on certain food surfaces, selectively varies the overall lightwave power density in the oven cavity, bakes foods with improved browning, and converts cooking recipes for conventional ovens to cooking recipes for a lightwave oven.

Figure 1A:
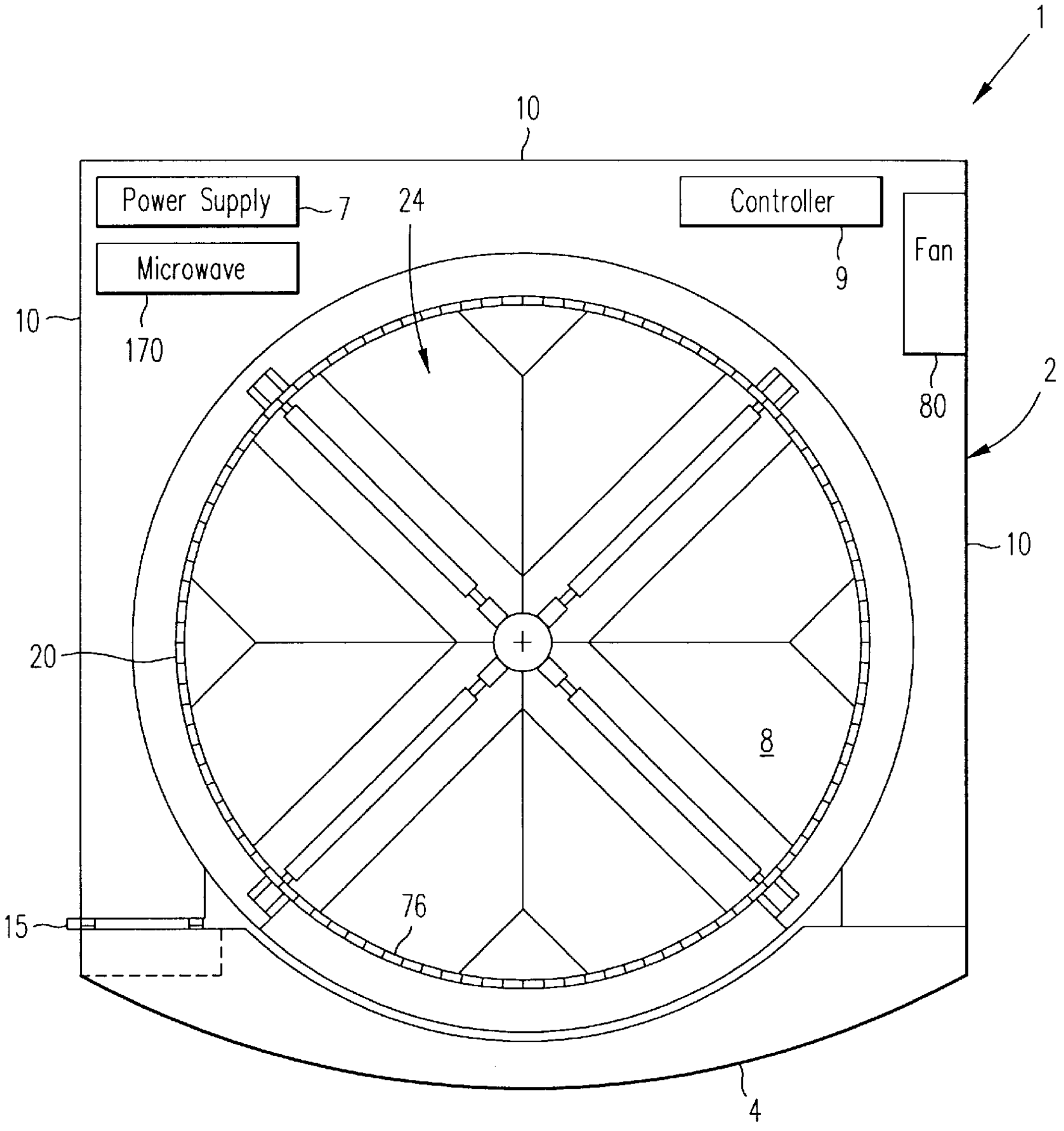
FIG. 1A is a top cross-sectional view of the lightwave oven of the present invention.
Figure 1B:
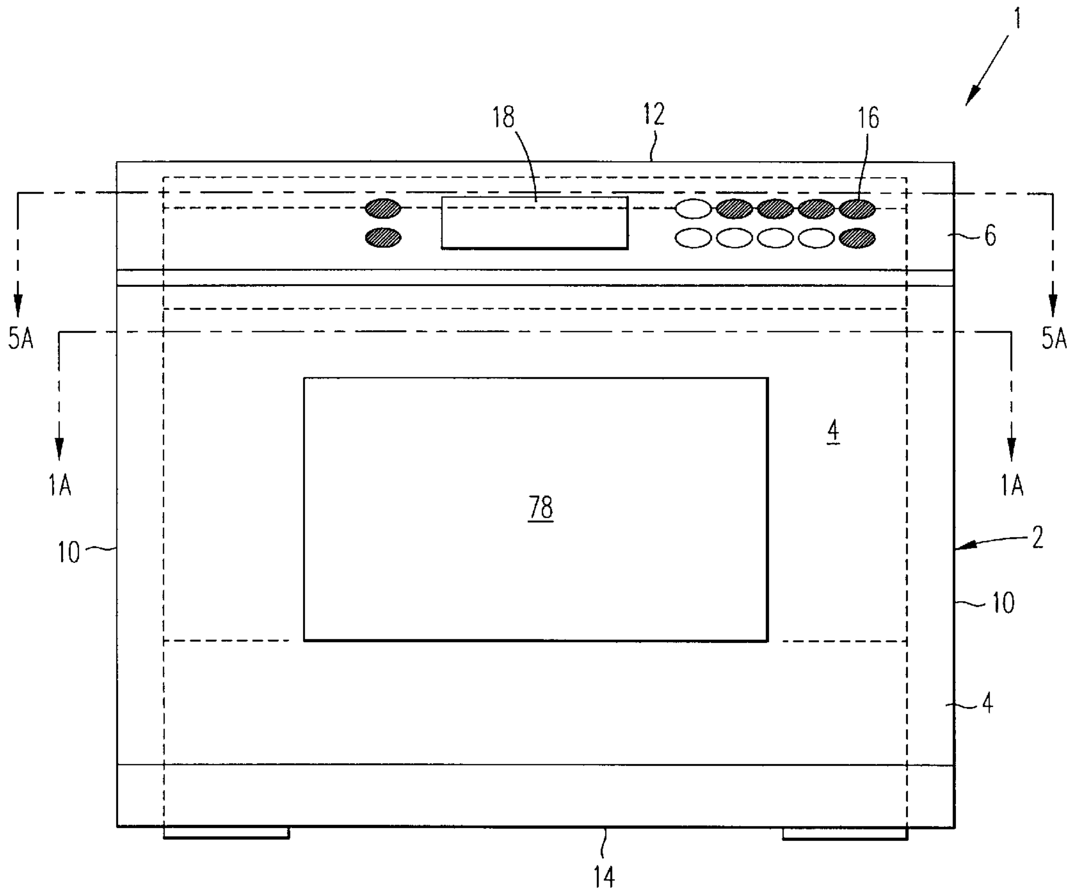
FIG. 1B is a front view of the lightwave oven of the present invention.
Figure 1C:
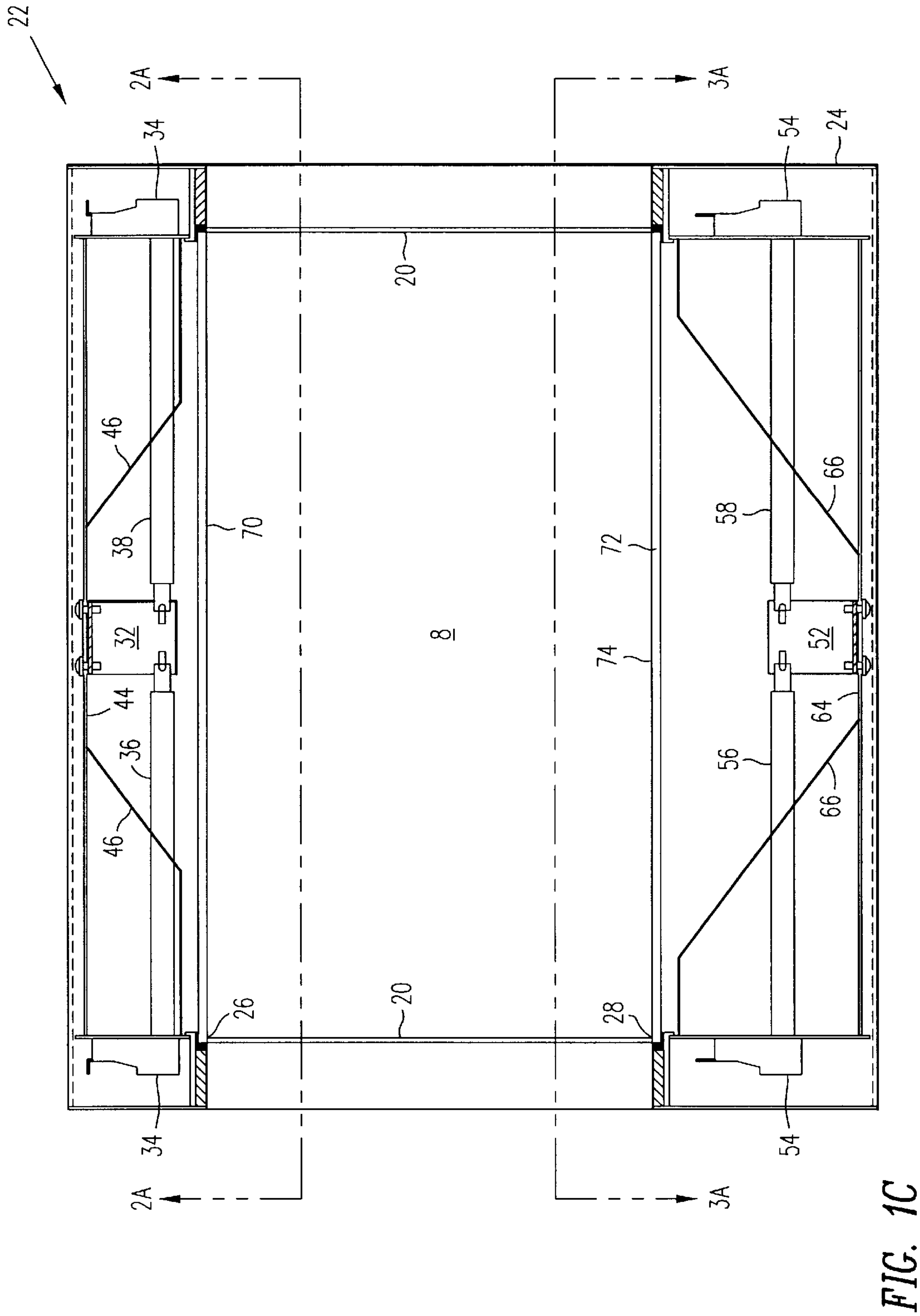
FIG. 1C is a side cross-sectional view of the lightwave oven of the present invention.

The present invention is described using a high efficiency cylindrically shaped oven 1 illustrated in FIGS. 1A–1C, which is ideal for connection to a standard 120 VAC kitchen outlet. Different modes of lamp operation are provided to effect cooking, crisping, grilling, defrosting, warming and baking of foodstuffs.

The lightwave oven 1 of the present invention includes a housing 2, a door 4, a control panel 6, a power supply 7, an oven cavity 8, and a controller 9.

The housing 2 includes sidewalls 10, top wall 12, and bottom wall 14.The door 4 is rotatably attached to one of the sidewalls 10 by hinges 15. Control panel 6, located above the door 4 and connected to controller 9, contains several operation keys 16 for controlling the lightwave oven 1, and a display 18 indicating the oven's mode of operation.

The oven cavity 8 is defined by a cylindrical-shaped sidewall 20, an upper reflector assembly 22 at an upper end 26 of sidewall 20, and a lower reflector assembly 24 at the lower end 28 of sidewall 20.

Figure 2B:
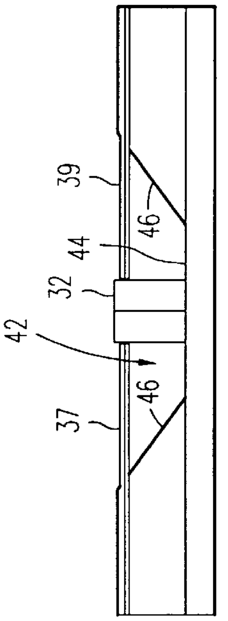
FIG. 2B is a side cross-sectional view of the upper reflector assembly of the present invention.
Figure 2A:
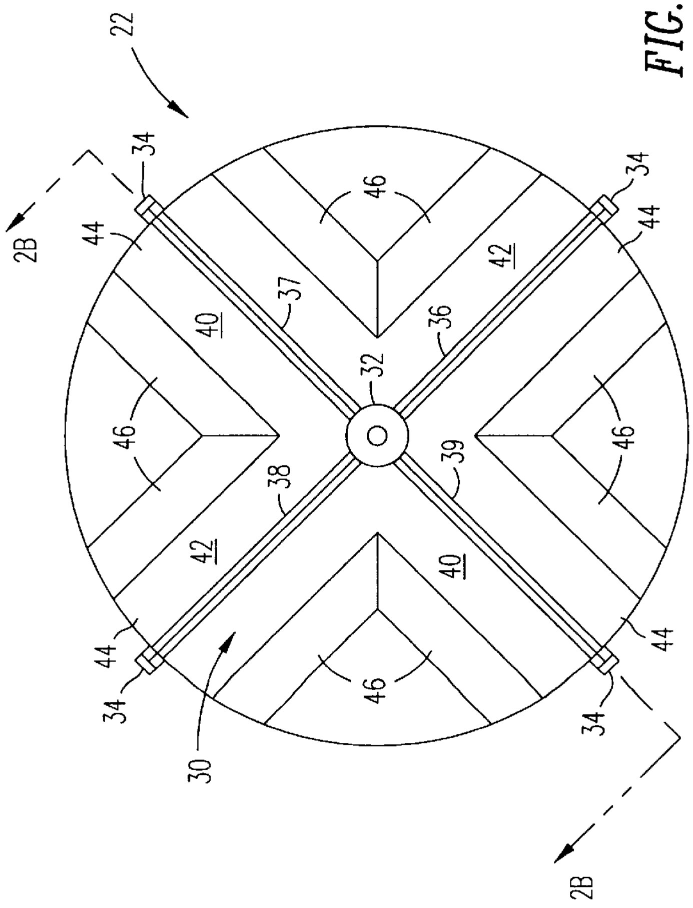
FIG. 2A is a bottom view of the upper reflector assembly of the present invention.
Figure 2C:
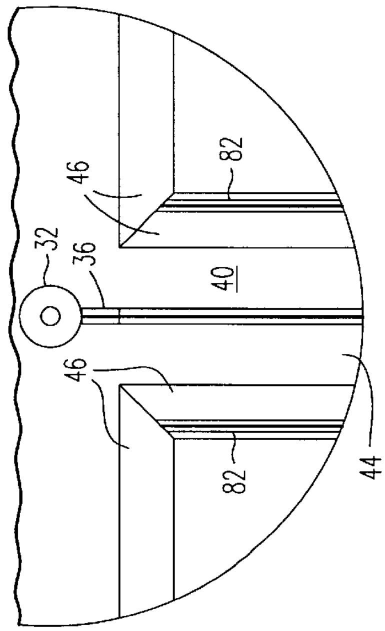
FIG. 2C is a partial bottom view of the upper reflector assembly of the present invention illustrating the virtual images of one of the lamps.

Upper reflector assembly 22 is illustrated in FIGS. 2A–2C and includes a circular, non-planar reflecting surface 30 facing the oven cavity 8, a center electrode 32 disposed at the center of the reflecting surface 30, four outer electrodes 34 evenly disposed at the perimeter of the reflecting surface 30, and four upper lamps 36, 37, 38, 39 each radially extending from the center electrode to one of the outer electrodes 34 and positioned at 90 degrees to the two adjacent lamps. The reflecting surface 30 includes a pair of linear channels 40 and 42 that cross each other at the center of the reflecting surface 30 at an angle of 90 degrees to each other. The lamps 36–39 are disposed inside of or directly over channels 40/42. The channels 40/42 each have a bottom reflecting wall 44 and a pair of opposing planar reflecting sidewalls 46 extending parallel to axis of the corresponding lamp 36–39.(Note that for bottom reflecting wall 44,"bottom" relates to its relative position with respect to channels 40/42 in their abstract, even though when installed wall 44 is above sidewalls 46.) Opposing sidewalls 46 of each channel 40/42 slope away from each other as they extend away from the bottom wall 44,forming an approximate angle of 45 degrees to the plane of the upper cylinder end 26.

Figure 3B:
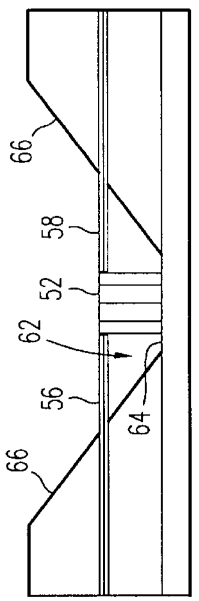
FIG. 3B is a side cross-sectional view of the lower reflector assembly of the present invention.
Figure 3A:
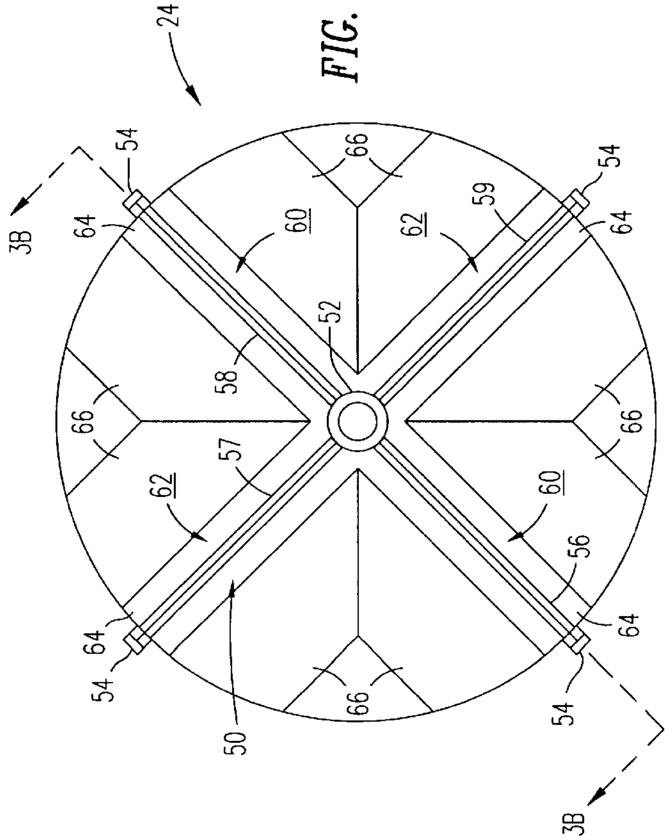
FIG. 3A is a top view of the lower reflector assembly of the present invention.
Figure 3C:
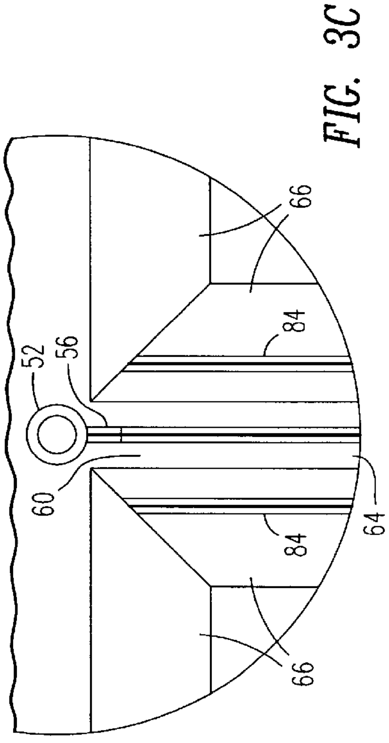
FIG. 3C is a partial top view of the lower reflector assembly of the present invention illustrating the virtual images of one of the lamps.

Lower reflector assembly 24 illustrated in FIGS. 3A–3C has a similar construction as upper reflector 22, with a circular, non-planar reflecting surface 50 facing the oven cavity 8, a center electrode 52 disposed at the center the reflecting surface 50, four outer electrodes 54 evenly disposed at the perimeter of the reflecting surface 50, and four lower lamps 56, 57, 58, 59 each radially extending from the center electrode to one of the outer electrodes 54 and positioned at 90 degrees to the two adjacent lamps. The reflecting surface 50 includes a pair of linear channels 60 and 62 that cross each other at the center of the reflecting surface 50 at an angle of 90 degrees to each other. The lamps 56–59 are disposed inside of or directly over channels 60/62. The channels 60/62 each have a bottom reflecting wall 64 and a pair of opposing planar reflecting sidewalls 66 extending parallel to axis of the corresponding lamp 56–59. Opposing sidewalls 66 of each channel 60/62 slope away from each other as they extend away from the bottom wall 64, forming an approximate angle of 45 degrees to the plane of the lower cylinder end 28.

Power supply 7 is connected to electrodes 32, 34, 52 and 54 to operate, under the control of controller 9, each of the lamps 36–39 and 56–59 individually.

To keep foods from splattering cooking juices onto the lamps and reflecting surfaces 30/50, transparent upper and lower shields 70 and 72 are placed at the cylinder ends 26/28 covering the upper/lower reflector assemblies 22/24 respectively. Shields 70/72 are plates made of a glass or a glass-ceramic material that has a very small thermal expansion coefficient. For the preferred embodiment glass-ceramic material available under the trademarks Pyroceram, Neoceram and Robax, and the borosilicate glass material available under the name Pyrex, have been successfully used. These lamp shields isolate the lamps and reflecting surfaces 30/50 so that drips, food splatters and food spills do not affect operation of the oven, and they are easily cleaned since each shield 70/72 consists of a single, circular plate of glass or glass-ceramic material.

While food is usually cooked in glass or metal cookware placed on the lower shield 72, it has been discovered that glass or glass-ceramic materials not only work well as a lamp shield, but also provide an effective surface to cook and bake upon. Therefore, the upper surface 74 of lower shield 72 serves as a cooktop. There are several advantages to providing such a cooking surface within the oven cavity. First, food can be placed directly on the cooktop 74 without the need for pans, plates or pots. Second, the radiation transmission properties of glass and glass-ceramic change rapidly at wavelengths near the range of 2.5 to 3.0 microns. For wavelengths below this range, the material is very transparent and above this range it is very absorptive. This means that the deeply penetrating visible and near-visible radiation can impinge directly on the foodstuff from all sides, while the longer infrared radiation is partially absorbed in the shields 70/72, heating them and thereby indirectly heating foodstuff in contact with surface 74 of shield 72. The conduction of the heat within the shield 72 evens out the temperature distribution in the shield and causes uniform heating of the foodstuff, which results in superior uniformity of food browning compared to radiation alone. Third, because the heating of the foodstuff is accomplished with no utensils, the cook times are generally shorter, since extra energy is not expended on heating the utensils. Typical foods that have been cooked and baked directly on cooktop 74 include pizza, cookies, biscuits, french fries, sausages, and chicken breasts.

Upper and lower lamps 36–39 and 56–59 are generally any of the quartz body, tungsten-halogen or high intensity discharge lamps commercially available, e.g., 1 KW 120 VAC quartz-halogen lamps. The oven according to the preferred embodiment utilizes eight tungsten-halogen quartz lamps, which are about 7 to 7.5 inches long and cook with approximately fifty percent (50%) of the energy in the visible and near-visible light portion of the spectrum at full lamp power.

Door 4 has a cylindrically shaped interior surface 76 that, when the door is closed, maintains the cylindrical shape of the oven cavity 8. A window 78 is formed in the door 4 (and surface 76) for viewing foods while they cook. Window 78 is preferably curved to maintain the cylindrical shape of the oven cavity 8.

In the oven of the present invention, the inner surface of cylinder sidewall 20, door inner surface 76 and reflective surfaces 30 and 50 are formed of a highly reflective material made from a thin layer of high reflecting silver sandwiched between two plastic layers and bonded to a metal sheet, having a total reflectivity of about 95%. Such a highly-reflective material is available from Alcoa under the tradename EverBrite 95, or from Material Science Corporation under the tradename Specular+ SR.

The window portion 78 of the preferred embodiment is formed by bonding the two plastic layers surrounding the reflecting silver to a transparent substrate such as plastic or glass (preferably tempered), instead of sheet metal that forms the rest of the door's substrate. It has been discovered that the amount of light that leaks through the reflective material used to form the interior of the oven is ideal for safely and comfortably viewing the interior of the oven cavity while food cooks.

It should also be noted that cylindrical sidewall 20 need not have a perfect cylinder shape to provide enhanced efficiency. Octagonal mirror structures have been used as an approximation to a cylinder, and have shown an increased efficiency over and above the rectangular box. In fact, any additional number of planar sides greater than the four of the standard box provides increased efficiency, and it is believed the maximum effect would accrue when the number of walls in such multi-walled configurations are pushed to their limit (e.g. the cylinder). The oven cavity can also have an elliptical cross-sectional shape, which has the advantage of fitting wider pan shapes into the cooking chamber compared to a cylindrical oven with the same cooking area.

Upper and lower reflector assemblies 22/24 provide a very uniform illumination field inside cavity 8, which eliminates the need to rotate the food for even cooking. A simple flat back-plane reflector behind the lamps would not give uniform illumination in a radial direction because the gap between the lamps increases as the distance from the center electrodes 32/52 increases. It has been discovered that this gap is effectively filled-in with lamp reflections from the channel sidewalls 46/66. FIGS. 2C and 3C illustrate the virtual lamp images 82/84 of one of the lamps 36/56, which fill in the spaces between the lamps near sidewall 20 with radiation directed into the oven cavity 8. From this it can be seen that the outer part of the cylinder field is effectively filled-in with the reflected lamp positions to give enhanced uniformity. Across this cylinder plane, a flat illumination has been produced within a variation of ±5% across a diameter of 12 inches measured 3 inches away from the lamp plane. For cooking purposes this variance shows adequate uniformity and a turntable is not necessary to cook food evenly.

The direct radiation from the lamps, combined with the reflections off of the non-planar reflecting surfaces 30/50, evenly irradiate the entire volume of the oven cavity 8. Further, any light missing the foodstuff, or reflected off of the foodstuff surface, is reflected by the cylindrical sidewall 20 and reflecting surfaces 30/50 so that the light is redirected back to the foodstuff.

Due to the proximity of lower reflector assembly 22 to the cooktop 74, lower reflector assembly 22 is taller than upper reflector assembly 24, and therefore channels 60/62 are deeper than channels 40/42. This configuration positions lower lamps 56–59 further away from cooktop 74 (upon which the foodstuff sits). The increased distance of cooktop 74 from lamps 56–59, and the deeper channels 60/62, were found necessary to provide more even cooking at cooktop 74.

Water vapor management, water condensation and airflow control in the cavity 8 can significantly affect the cooking of the food inside oven 1. It has been found that the cooking properties of the oven (i.e., the rate of heat rise in the food and the rate of browning during cooking) is strongly influenced by the water vapor in the air, the condensed water on the cavity sides, and the flow of hot air in the cylindrical chamber. Increased water vapor has been shown to retard the browning process and to negatively affect the oven efficiency. Therefore, the oven cavity 8 need not be sealed completely, to let moisture escape from cavity 8 by natural convection. Moisture removal from cavity 8 can be enhanced through forced convention. A fan 80, which can be controlled as part of the cooking formulas discussed below, provides a source of fresh air that is delivered to the cavity 8 to optimize the cooking performance of the oven.

Figure 4A:
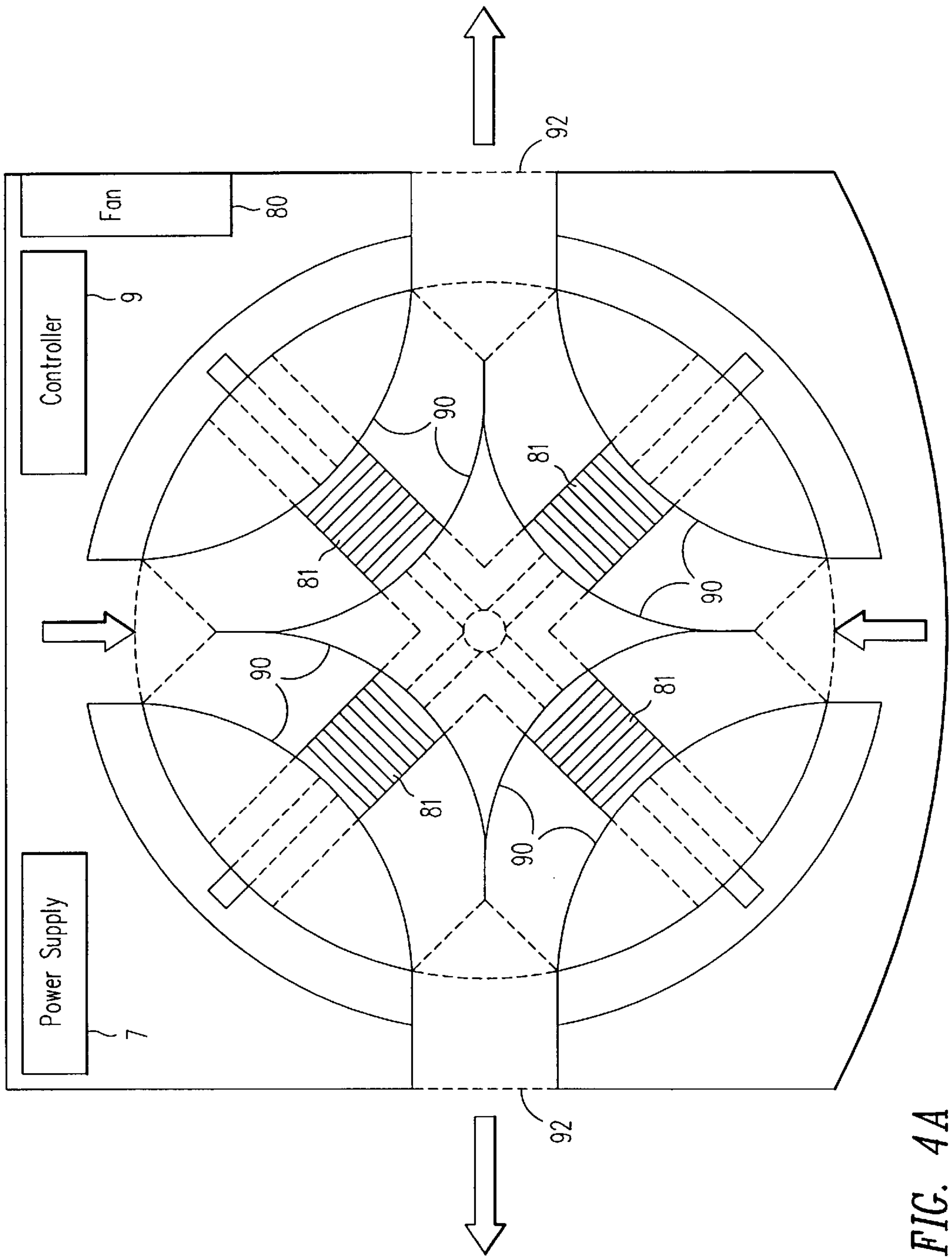
FIG. 4A is a top cross-sectional view of the upper portion of lightwave oven of the present invention.
Figure 4B:
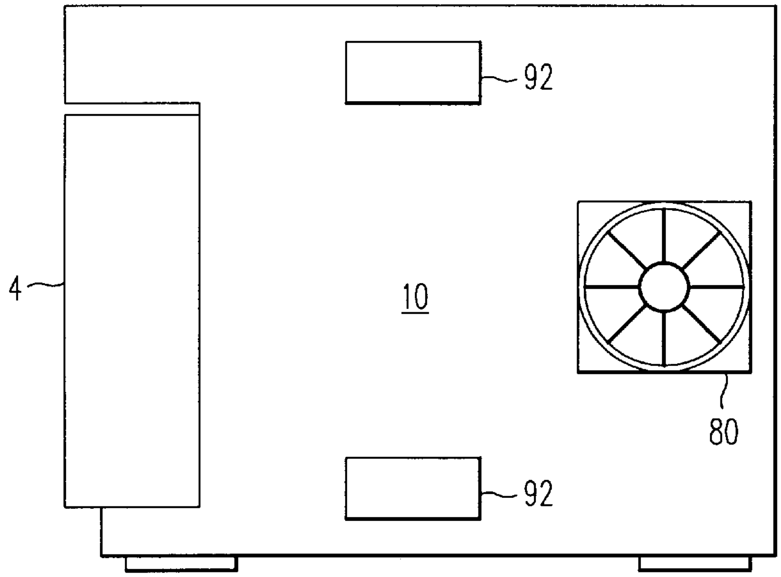
FIG. 4B is a side view of the housing for the lightwave oven of the present invention.

Fan 80 also provides fresh cool air that is used to cool the high reflectance internal surfaces of the oven cavity 8, as illustrated in FIGS. 4A and 4B. During operation, reflecting surfaces 30/50, and sidewall 20, if left uncooled, could reach very high temperatures that can damage these surfaces. Therefore, fan 80 creates a positive pressure within the oven housing 2 which, in effect, creates a large cooking air manifold. The pressure within the housing 2 causes cooling air to flow over the back surface of cylindrical sidewall 20 and into integral ducting 90 formed between each of the reflector assemblies 30/50 and the housing 2. It is most important to cool the back side portions of bottom wall 44/64 and sidewalls 46/66 that are in the closest proximity to the lamps. To enhance the cooling efficiency of these areas of reflector assemblies 24/26, cooling fins 81 are bonded to the backside of reflecting surfaces 30/50 and positioned in the airstream of cooling air flowing through ducting 90. The cooling air flows in through fan 80, over the back surface of cylindrical sidewall 20, through ducting 90, and out exhaust ports 92 located on the oven's sidewalls 10. The airflow from fan 80 can further be used to cool the oven power supply 7 and controller 9. FIG. 4A illustrates the cooling ducts for upper reflector assembly 22. Ducting 90 and fins 81 are formed under reflector assembly 24 in a similar manner.

One drawback to using the 95% reflective silver layer sandwiched between two plastic layers is that it has a lower heat tolerance than the 90% reflective high purity aluminum. This can be a problem for reflective surfaces 30 and 50 of the reflector assemblies 22/24 because of the proximity of these surfaces to the lamps. The lamps can possibly heat the reflective surfaces 30/50 above their damage threshold limit. One solution is a composite oven cavity, where reflective surfaces 30 and 50 are formed of the more heat resistant high purity aluminum, and the cylindrical sidewall reflective surface 20 is made of the more reflective silver layer. The reflective surfaces 30/50 will operate at higher temperatures because of the reduced reflectivity, but still well below the damage threshold of the aluminum material. In fact, the damage threshold is high enough that fins 81 probably are not necessary. This combination of reflective surfaces provides high oven efficiency while minimizing the risk of reflector surface damage by the lamps.

Figure 5:
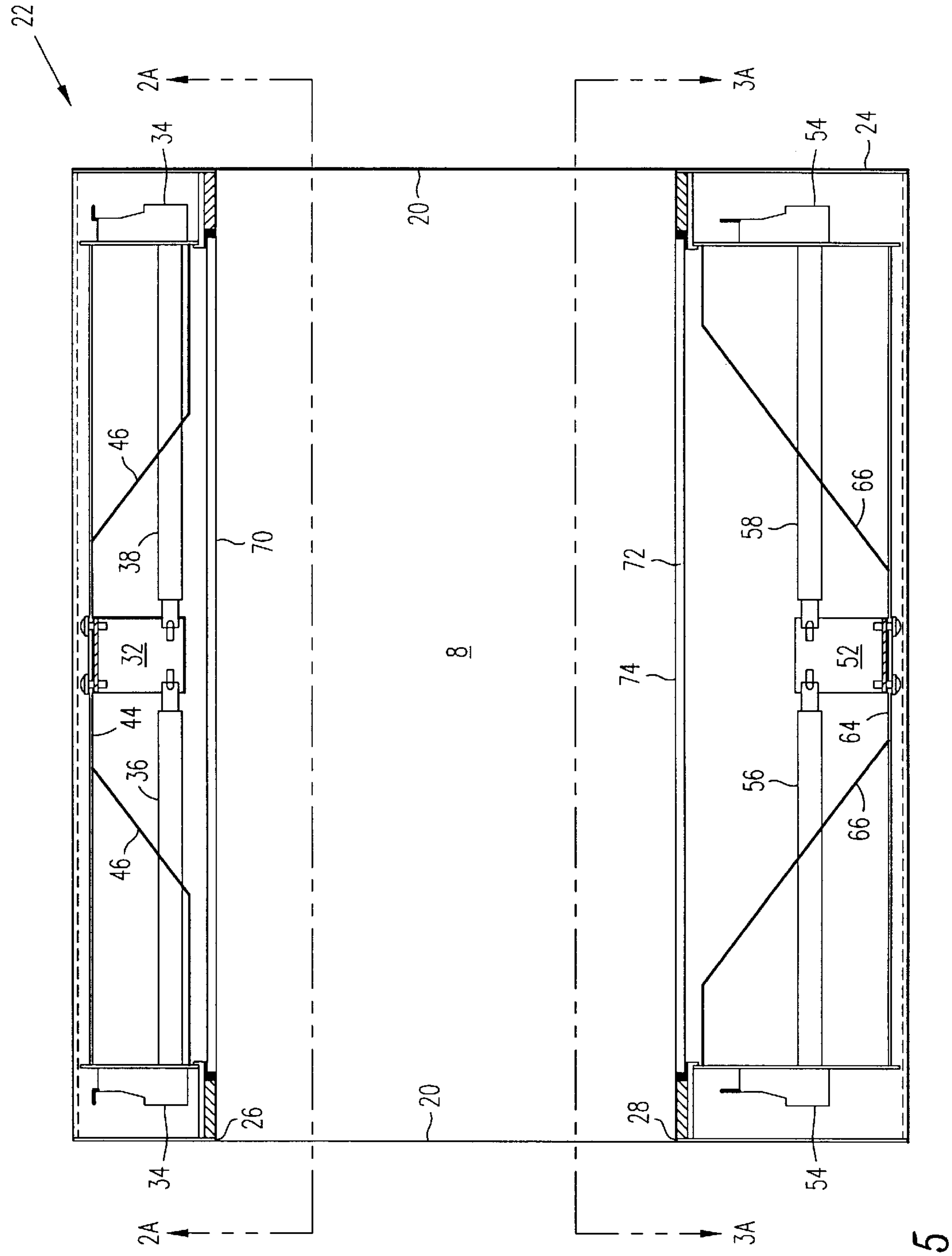
FIG. 5 is a side cross-sectional view of another alternate embodiment of the present invention.
Figure 6:
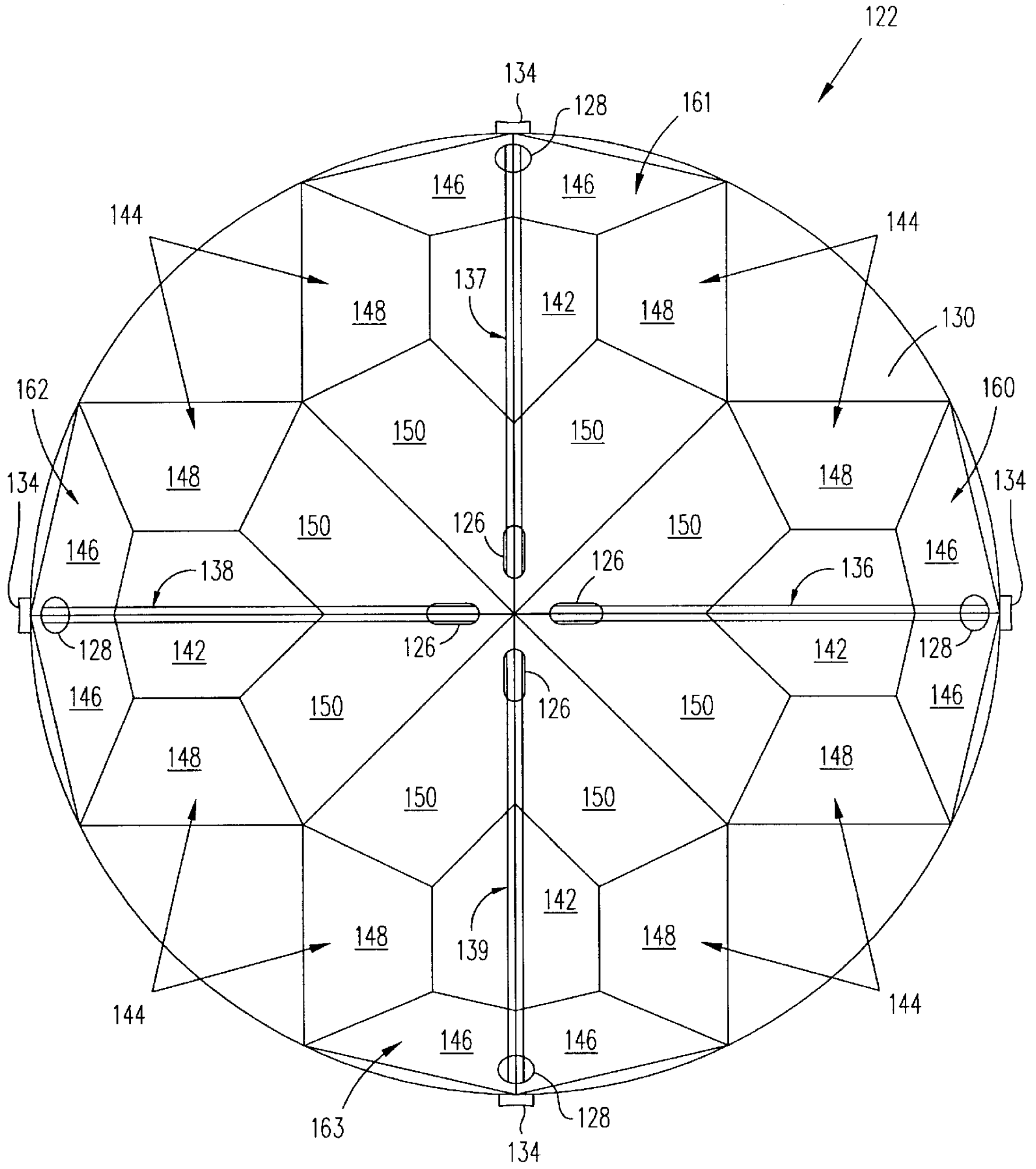
FIG. 6 is a top view of an alternate embodiment reflector assembly for the present invention, which includes reflector cups underneath the lamps.
Figure 7A:
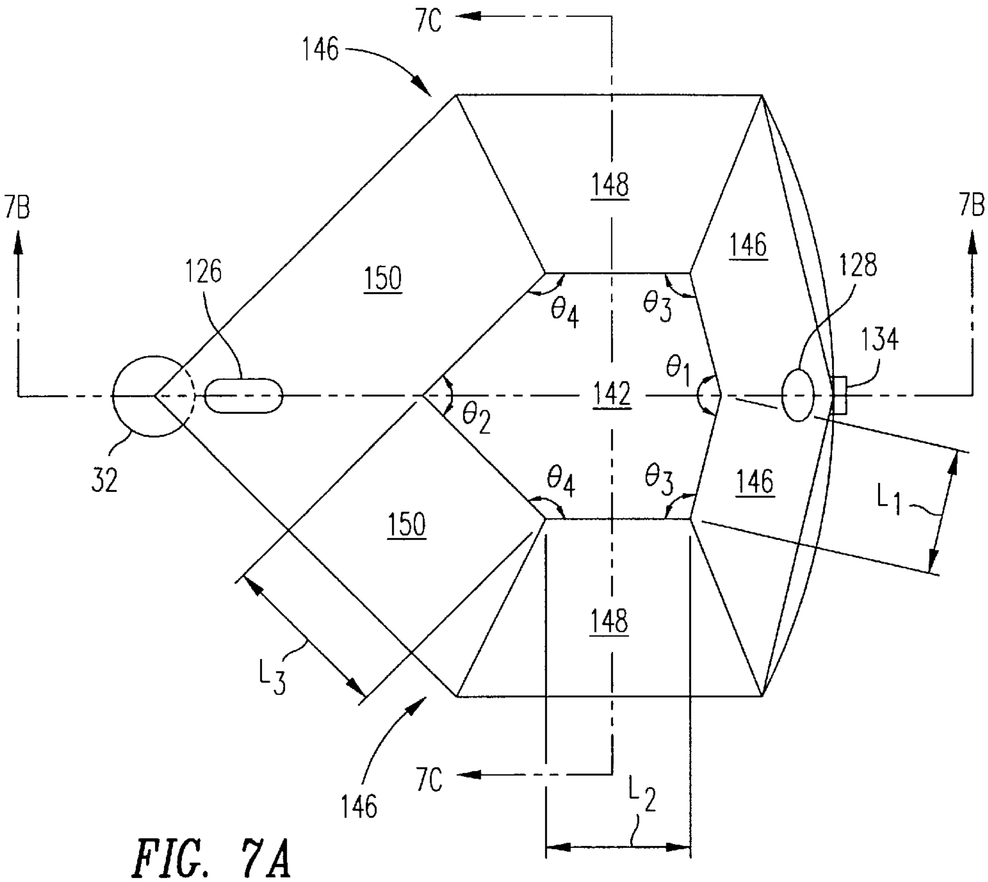
FIG. 7A is a top view of one of the reflector cups for the alternate embodiment reflector assembly of the present invention.
Figure 7B:
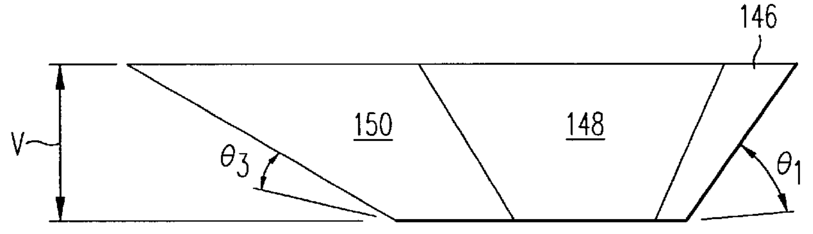
FIG. 7B is a side cross-sectional view of the reflector cup of FIG. 7A.
Figure 7C:
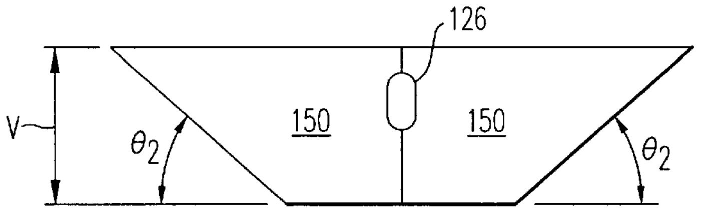
FIG. 7C is an end cross-sectional view of the reflector cup of FIG. 7A.

It should be noted that the shape or size of cavity 8 need not match the shape/size of upper/lower reflector assemblies 22/24. For example, the cavity 8 can have a diameter that is larger than that of the reflector assemblies, as illustrated in FIG. 5. This allows for a larger cooking area with little or no reduction in oven efficiency. Alternately, the cavity 8 can have an elliptical cross-section, with reflector assemblies 22/24 that are matched in shape (e.g. elliptical with channels 40/42, 60/62 not crossing perpendicular to each other), or have a more circular shape than the cavity 8.

A second reflector assembly embodiment 122 is illustrated in FIGS. 6 and 7A–7C that can be used instead of upper/lower reflector assembly designs 22/24 described above. Reflector assembly 122 includes a circular, non-planar reflecting surface 130 facing the oven cavity 8, a center electrode 132 disposed underneath the center of the reflecting surface 130, four outer electrodes 134 evenly disposed at the perimeter of the reflecting surface 130, and four lamps 136, 137, 138, 139 each radially extending from the center electrode 132 to one of the outer electrodes 134 and positioned at 90 degrees to the two adjacent lamps. The reflecting surface 30 includes reflector cups 160, 161, 162 and 163 each oriented at a 90 degree angle to the adjacent reflector cup. The lamps 136-39 are shown disposed inside of cups 160–163, but could also be disposed directly over cups 160–163. The lamps enter and exit each cup through access holes 126 and 128. The cups 160–163 each have a bottom reflecting wall 142 and a pair of shaped opposing sidewalls 144 best illustrated in FIGS. 7A and 7B. (Note that for bottom reflecting wall 142,"bottom" relates to its relative position with respect to cups 160–163 in their abstract, even though when installed facing downward wall 142 is above sidewalls 144.) Each sidewall 144 includes 3 planar segments 146, 148 and 150 that generally slope away from the opposing sidewall 144 as they extend away from the bottom wall 142. Therefore, there are seven reflecting surfaces that form each reflector cup 160–163: three from each of the two sidewalls 144 and the bottom reflecting wall 142.

The formation and orientation of the planar segments 146/148/150 is defined by the following parameters: the length L of each segment measured at the bottom wall 142, the angle of inclination θ of each segment relative to the bottom wall 142, the angular orientation Φ between adjacent segments, and the total vertical depth V of the segments. These parameters are selected to maximize efficiency and the evenness of illumination in the oven cavity 8. Each reflection off of reflecting surface 130 induces a 5% loss. Therefore, the planar segment parameters listed above are selected to maximize the number of light rays that are reflected by reflector assembly 122 1) one time only, 2) in a direction substantially perpendicular to the plane of the reflector assembly 122, and 3) in a manner that very evenly illuminates the oven cavity 8.

A pair of identical reflector assemblies 122 as described above have been made such that when installed to replace upper and lower reflector assemblies 22/24 above and below the oven cavity 8, excellent efficiency and uniform cavity illumination have been achieved. The reflector assembly 122 of the preferred embodiment has the following dimensions. The reflector assembly 122 has a diameter of about 14.7 inches, and includes 4 identically shaped reflector cups 160–163. Lengths $L_1$, $L_2$ and $L_3$ of segments 146, 148 and 150 respectively are about 1.9, 1.6, and 1.8 inches. The angles of inclination $\theta_1$, $\theta_2$, and $\theta_3$ for segments 146, 148 and 150 respectively are about 54°, 42° and 31°. The angular orientation $\Phi_1$ between the two segments 146 is about 148°, $\Phi_2$ between the two segments 150 is about 90°, $\Phi_3$ between segments 146 and 148 is about 106°, $\Phi_4$ between segments 148 and 150 is about 135°. The total vertical depth V of the sidewalls 144 is about 1.75 inches.

Figure 8:
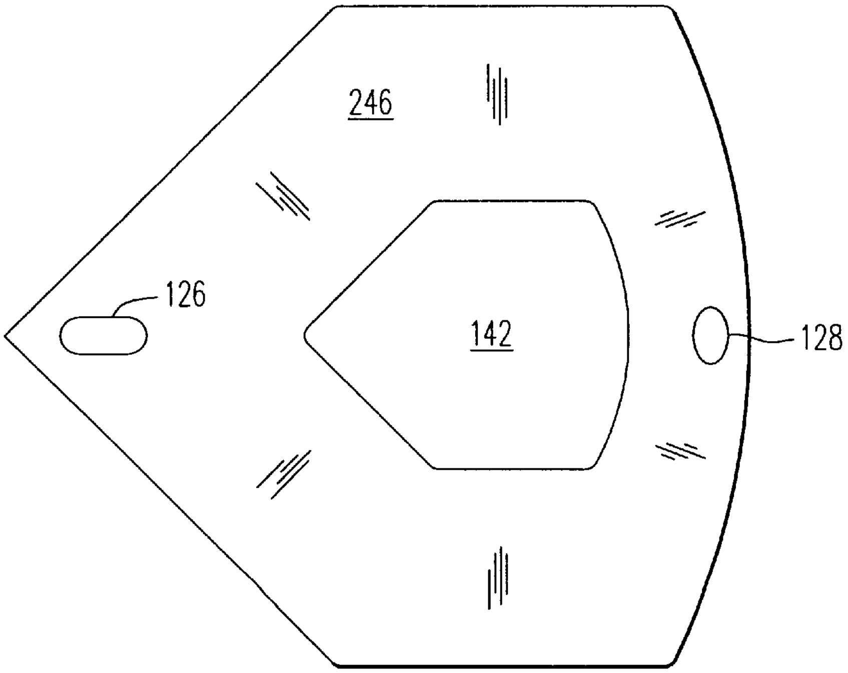
FIG. 8 is a top view of an alternate embodiment of the reflector cup of FIG. 7A.

While reflector assembly 122 is shown with three planar segments 146/148/150 for each side wall 144, greater or few segments can be used to form the reflecting cups 160–163 having a similar shape to the reflecting cups described above. In fact, a single non-planar shaped side wall 246 can be made that has a similar shape to the 6 segments that form the two sidewalls 144 of FIGS. 7A–7C, as illustrated in FIG. 8.

While all eight lamps could operate simultaneously at full power if adequate electrical power were available, the lightwave oven of the preferred embodiment has been specifically designed to operate as a counter-top oven that plugs into a standard 120 VAC outlet. A typical home kitchen outlet can only supply 15 amps of electrical current, which corresponds to about 1.8 KW of power. This amount of power is sufficient to only operate two commercially available 1 KW tungsten halogen lamps at color temperatures of about 2900°K. Operating additional lamps all at significantly lower color temperatures is not an option because the lower color temperatures do not produce sufficient amounts of visible and near-visible light. However, by sequential lamp operation as described below and illustrated in FIGS. 9A–9C, different selected lamps from above and below the food can be sequentially switched on and off at different times to provide a uniform time-averaged power density of about 0.7 W/cm$^2$ without having more than two lamps operating at any given time. This power density cooks food about twice as fast as a conventional oven.

For example, one lamp above and one lamp below the cooking region can be turned on for a period of time (e.g. 2 seconds). Then, they are turned off and two other lamps are turned on for 2 seconds, and so on. By sequentially operating the lamps in this manner, a cooking region far too large to be evenly illuminated by only two lamps is in fact evenly illuminated when averaged over time using eight lamps with no more than two activated at once. Further, some lamps may be skipped or have operation times reduced to provide different amounts of energy to different portions of the food surface.

Figure 9A:
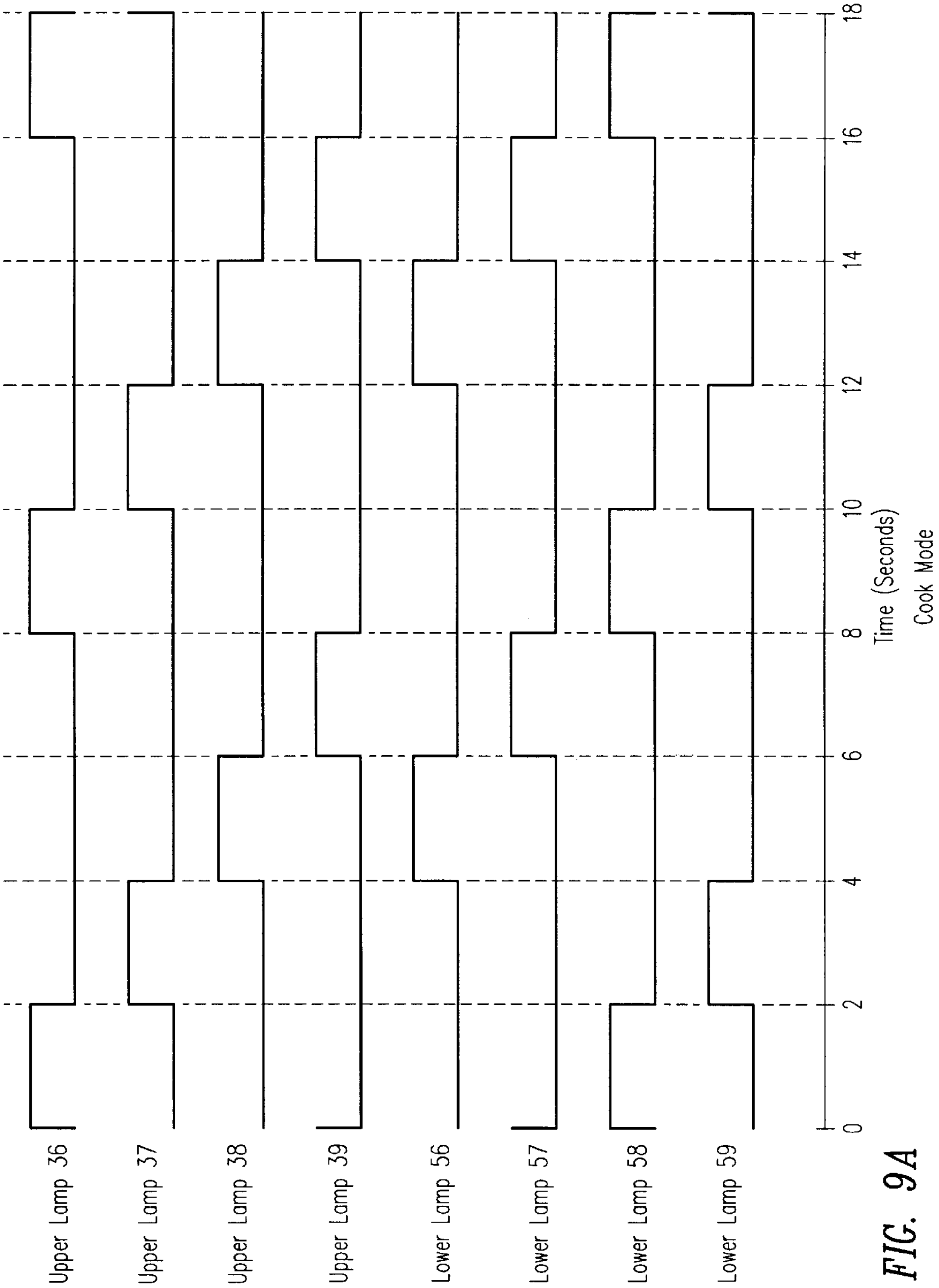
FIG. 9A is a graph showing the sequential lamp activation times of the present invention for the cook mode of operation.

A first mode of sequential lamp operation (cook mode) for evenly cooking all sides of the food is illustrated in FIG. 9A. In cook mode, one upper lamp 36 and one lower lamp 58 are initially turned on, so that the total operating power does not exceed twice the operating power of each of the lamps. These lamps 36/58 are maintained on for a given period of time, such as two seconds, and then are turned off (for about 6 seconds). At the time lamps 36/58 are turned off, a different upper lamp 37 and a different lower lamp 59 are turned on. These lamps 37/59 are maintained on for two seconds and are then turned off at the same time the upper lamp 38 and lower lamp 56 are turned on, to be followed in sequence by upper lamp 39 and lower lamp 57. This cook mode sequential lamp operation continues repeatedly which provides time-averaged uniform cooking of the food in the oven chamber 8 without drawing more than the power needed to operate two lamps simultaneously. Preferably, the upper lamp in operation is on the opposite side of the reflector assembly 22 than the corresponding side of reflector assembly 24 containing the lower lamp in operation. Therefore, lamp operation above the food rotates among the four upper lamps 36–39 in the same direction around the cavity as the rotation of lamp operation below the food among the four lower lamps 56–59.

Figure 9B:
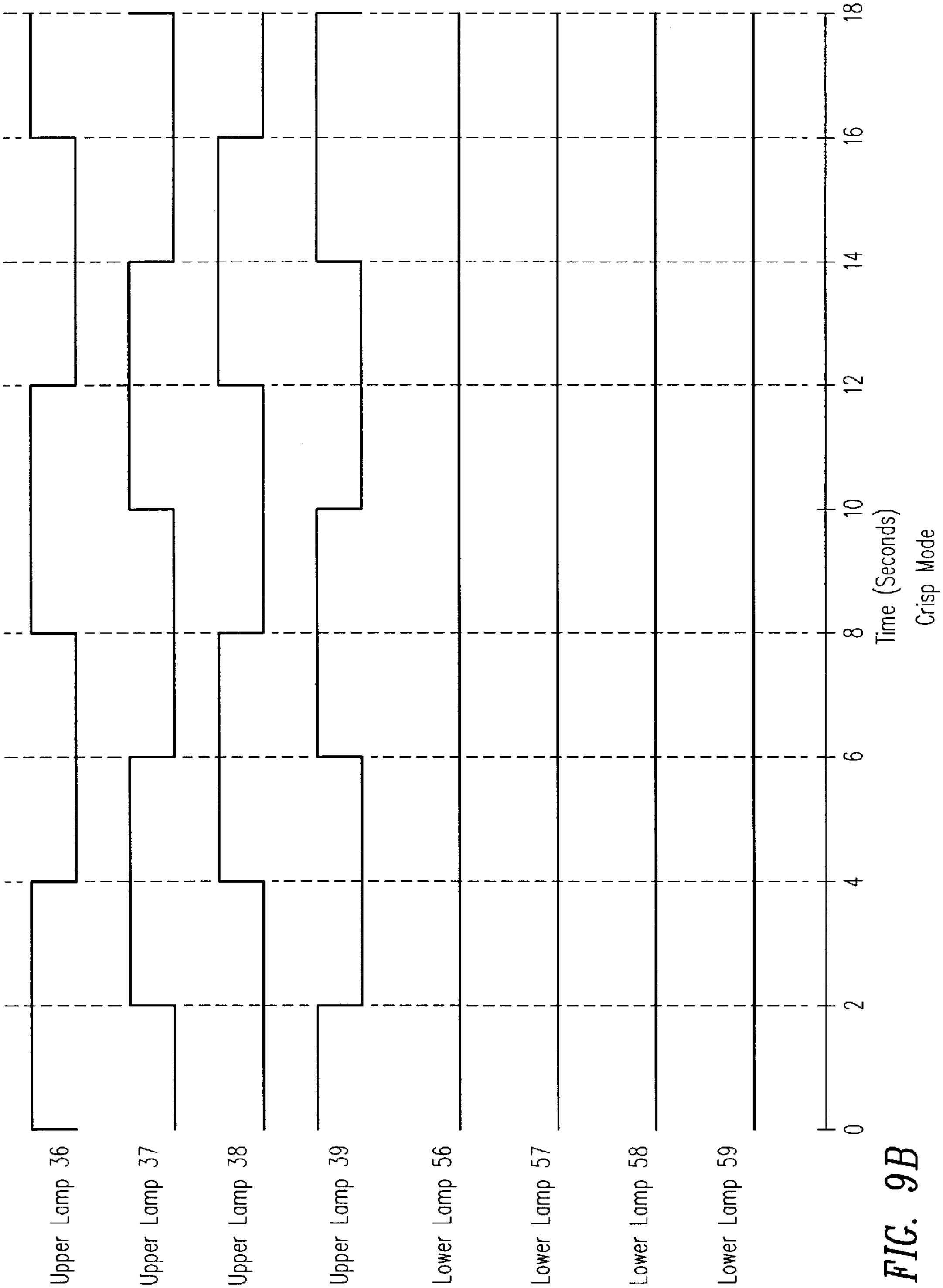
FIG. 9B is a graph showing the sequential lamp activation times of the present invention for the crisp mode of operation.

A second mode of sequential lamp operation (crisp mode) for cooking and browning mainly the top side of the food is illustrated in FIG. 9B. In crisp mode, each upper lamp 36–39 is turned on for four seconds, then turned off for four seconds, with the operation of these lamps staggered so that only two lamps are on at any given time. Lower lamps 56–59 are not activated. For example, two upper lamps 36/39 are initially turned on, so that the total operating power does not exceed twice the operating power of each of the lamps. These upper lamps 36/39 are maintained on for a given period of time, such as two seconds, and then one of the lamps 39 is turned off, and another upper lamp 37 is turned on. Two seconds later, upper lamp 36 is turned off, and upper lamp 38 is turned on. Two seconds later, upper lamp 37 is turned off and upper lamp 39 is turned on. This crisp mode sequential lamp operation continues repeatedly which provides time-averaged uniform irradiation of mainly the top surface of the food in the oven chamber 8 without drawing more than the power needed to operate two lamps simultaneously.

Figure 9C:
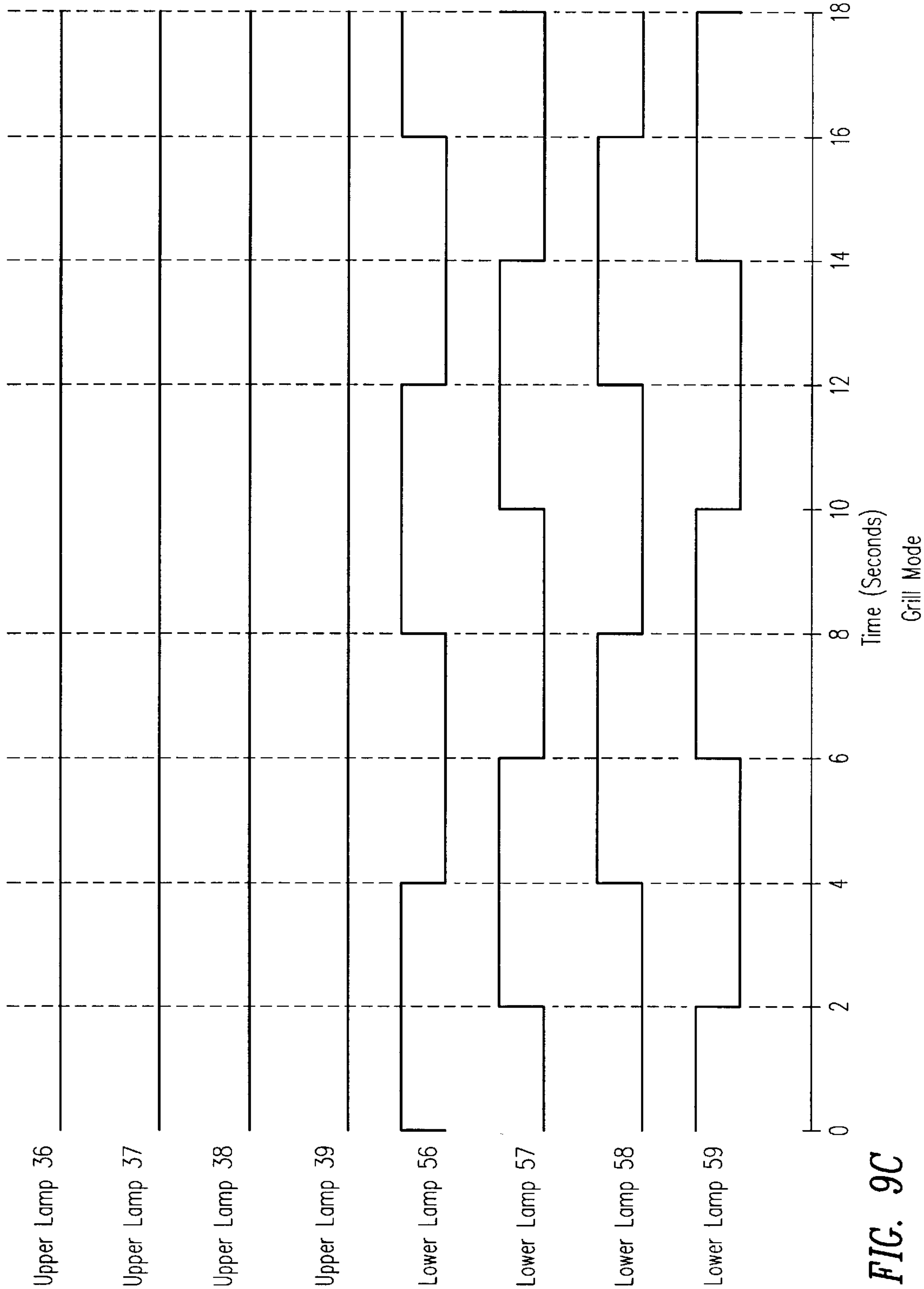
FIG. 9C is a graph showing the sequential lamp activation times of the present invention for the grill mode of operation.

A third mode of sequential lamp operation (grill mode) for cooking and browning mainly the bottom side of the food such as pizzas and for searing and grilling meats is illustrated in FIG. 9C, and is identical to the crisp mode except just the bottom lamps 56–59 are operated instead of just the top lamps 36–39. In grill mode, each lower lamp 56–59 is turned on for four seconds, then turned off for four seconds, with the operation of these lamps staggered so that only two lamps are on at any given time. For example, two lower lamps 56/59 are initially turned on, so that the total operating power does not exceed twice the operating power of each of the lamps. These lower lamps 56/59 are maintained on for a given period of time, such as two seconds, and then one of the lamps 59 is turned off, and another lower lamp 57 is turned on. Two seconds later, lower lamp 56 is turned off, and lower lamp 58 is turned on. Two seconds later, lower lamp 57 is turned off and lower lamp 59 is turned on. This grill mode sequential lamp operation continues repeatedly which provides time-averaged uniform irradiation of mainly the bottom surface of the food in the oven chamber 8 without drawing more than the power needed to operate two lamps simultaneously.

Often this grill mode of operation is used in conjunction with a special broiler pan to improve the grilling of meats and fish. This pan has a series of formed linear ridges on its upper surface which supports and elevates the food. The valleys between the ridges serve to catch the grease from the grilling process so that the food is separated from its drippings for better browning. The entire pan heats up quickly from the bottom radiant energy in the grill mode, and this heat sears the surface of the food that is in contact with the ridges, leaving browned grill marks on the food surface. The surface of the pan is coated with a non-stick material to make cleaning easier. Visible and near-visible radiation from the bottom lamps can also bounce from the sidewall 20 and upper reflecting surface 30 to strike the food from the top and sides. This additional energy aids in the cooking of the top portion of the food.

A fourth mode of operation is the warming mode, where all lamps 36–39 and 56–59 are all operated simultaneously, not sequentially, at low power (e.g. 20% of full power) so that the total power of all eight operating lamps does not exceed the full power operation of two of the lamps (i.e. about 1.8 KW). With lamps operating at such a low power, and therefore a low color temperature, most of the radiation emitted by the lamps in warming mode is infrared radiation, which is ideal for keeping food warm (at a stable temperature) without further cooking it.

It should be noted that the operating times of 2 seconds in cook mode or 4 seconds in grill or crisp modes for each lamp described above are illustrative, and can be lower or higher as desired. However, if the lamp operating time is set too low, efficiency will be lost because the finite time needed to bring the lamps up to operating color temperature causes the average lamp output spectrum to shift undesirably toward the red end of the spectrum. If the lamp operating time is too long, uneven cooking will result. It has been determined that a lamp operating time of up to at least 15 seconds provides excellent efficiency without causing significant uneven cooking.

In the cook mode described above, an average cooking power density of about 0.7 $W/cm^2$ is generated in the oven cavity 8 by two lamps operating at full power (100% oven intensity). However, it is anticipated that some cooking recipes will require the oven intensity to be reduced below 100% for some or all of the cooking time. Reducing power to the lamps reduces the color temperature of the lamps, and thus the percentage of the visible and near-visible light emitted by the lamps. Therefore, instead of individual lamp power reduction that affects the lamp output spectrum, the present invention includes the feature of reducing the overall oven duty cycle (reducing the average power level from one or both lamp sets) without adversely affecting the spectral output of the lamps.

Figure 10:
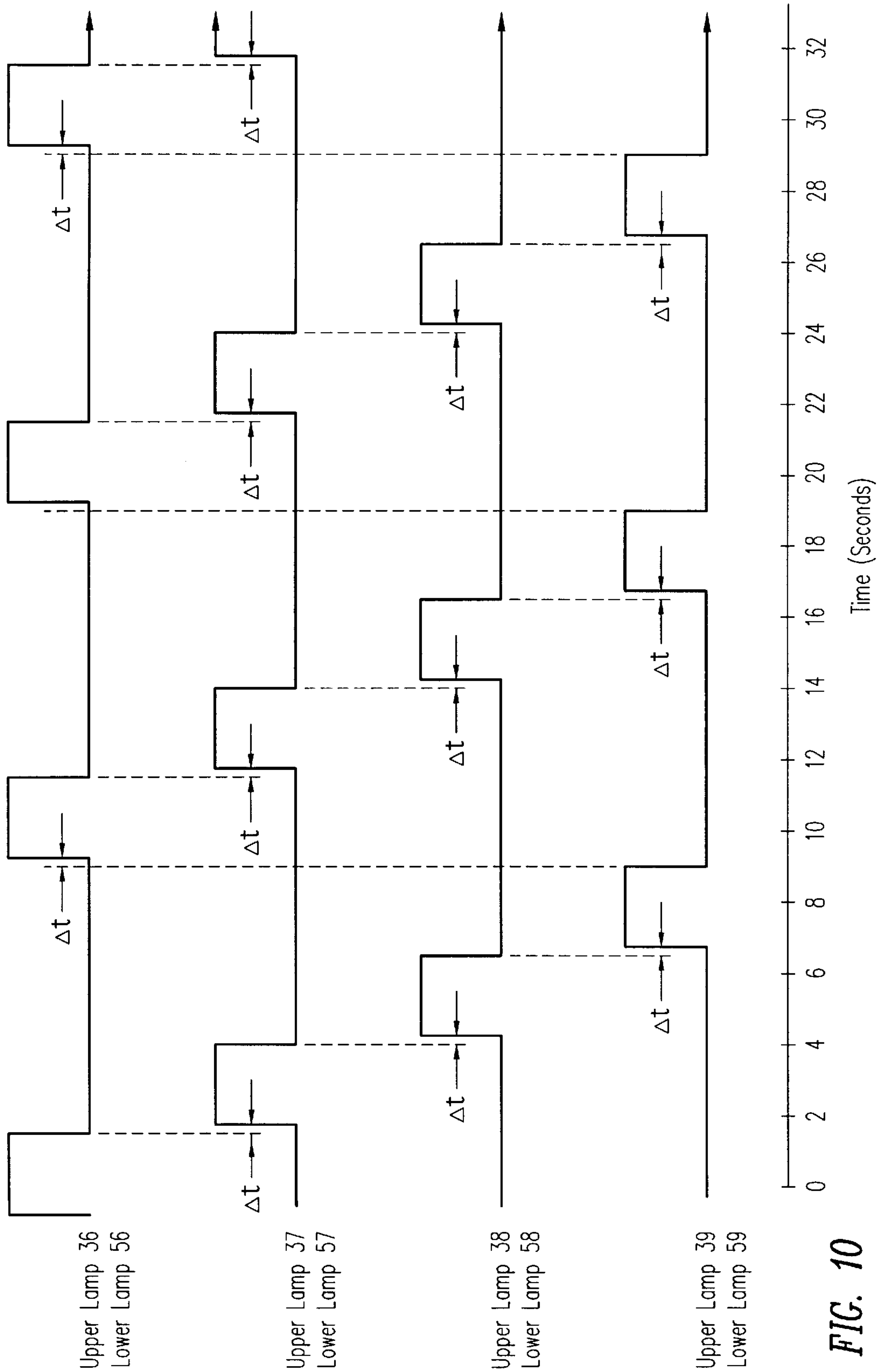
FIG. 10 is a graph showing the sequential lamp activation times for the cook mode of operation with a reduced oven intensity.
Figure 11A:
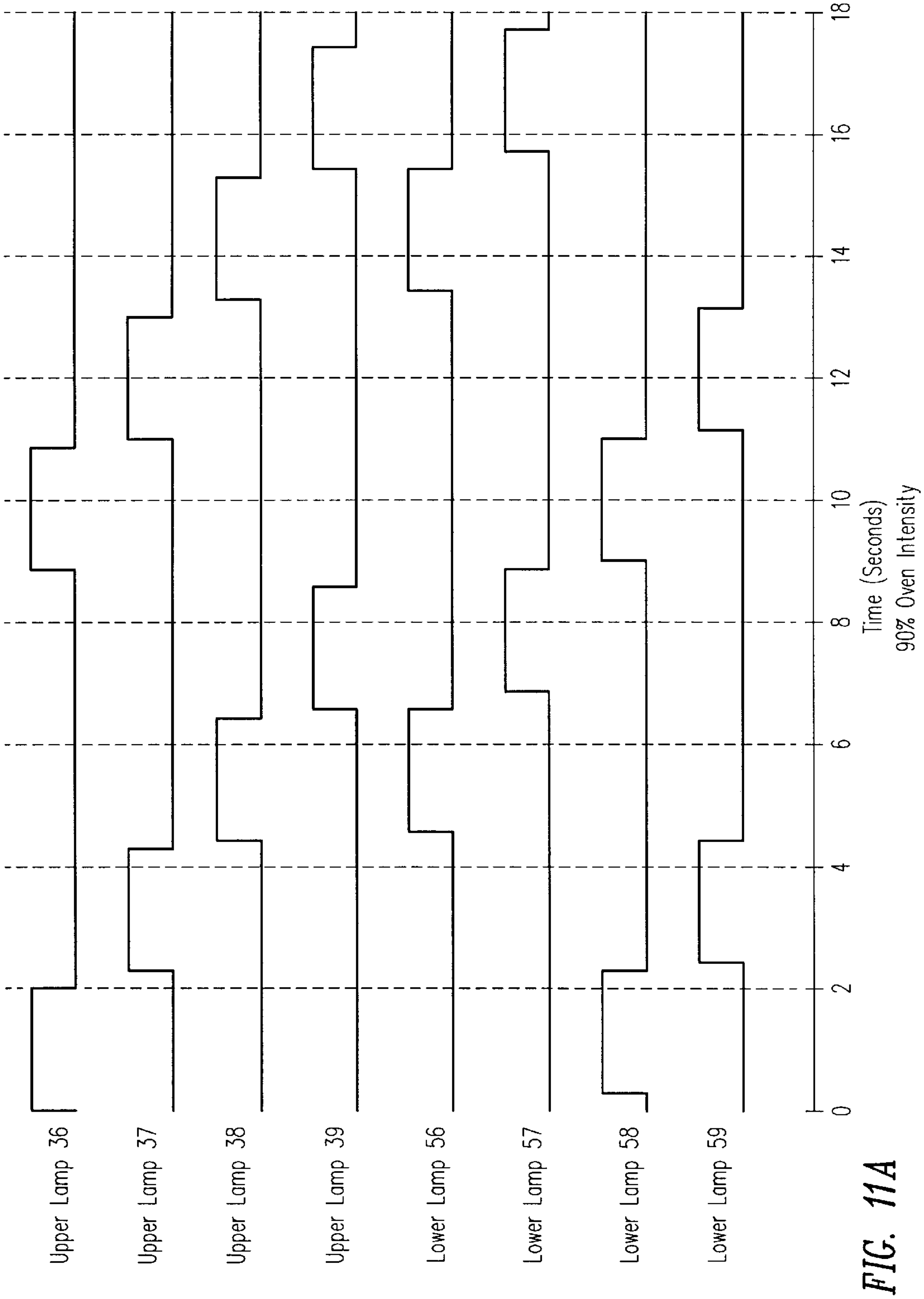
FIG. 11A is a graph showing the sequential lamp activation times for the cook mode of operation with a reduced oven intensity of 90%.
Figure 11B:
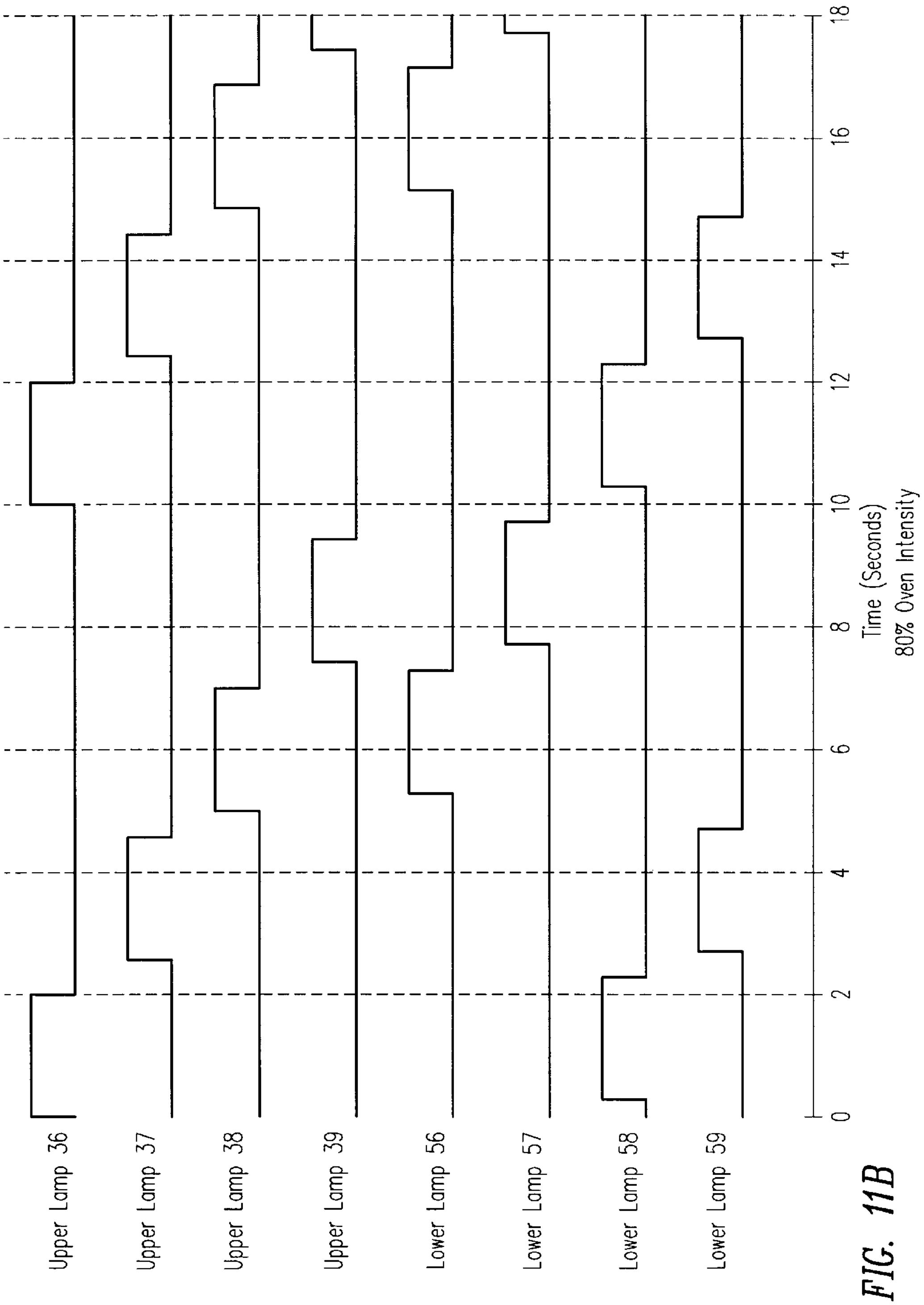
FIG. 11B is a graph showing the sequential lamp activation times for the cook mode of operation with a reduced oven intensity of 80%.
Figure 11C:
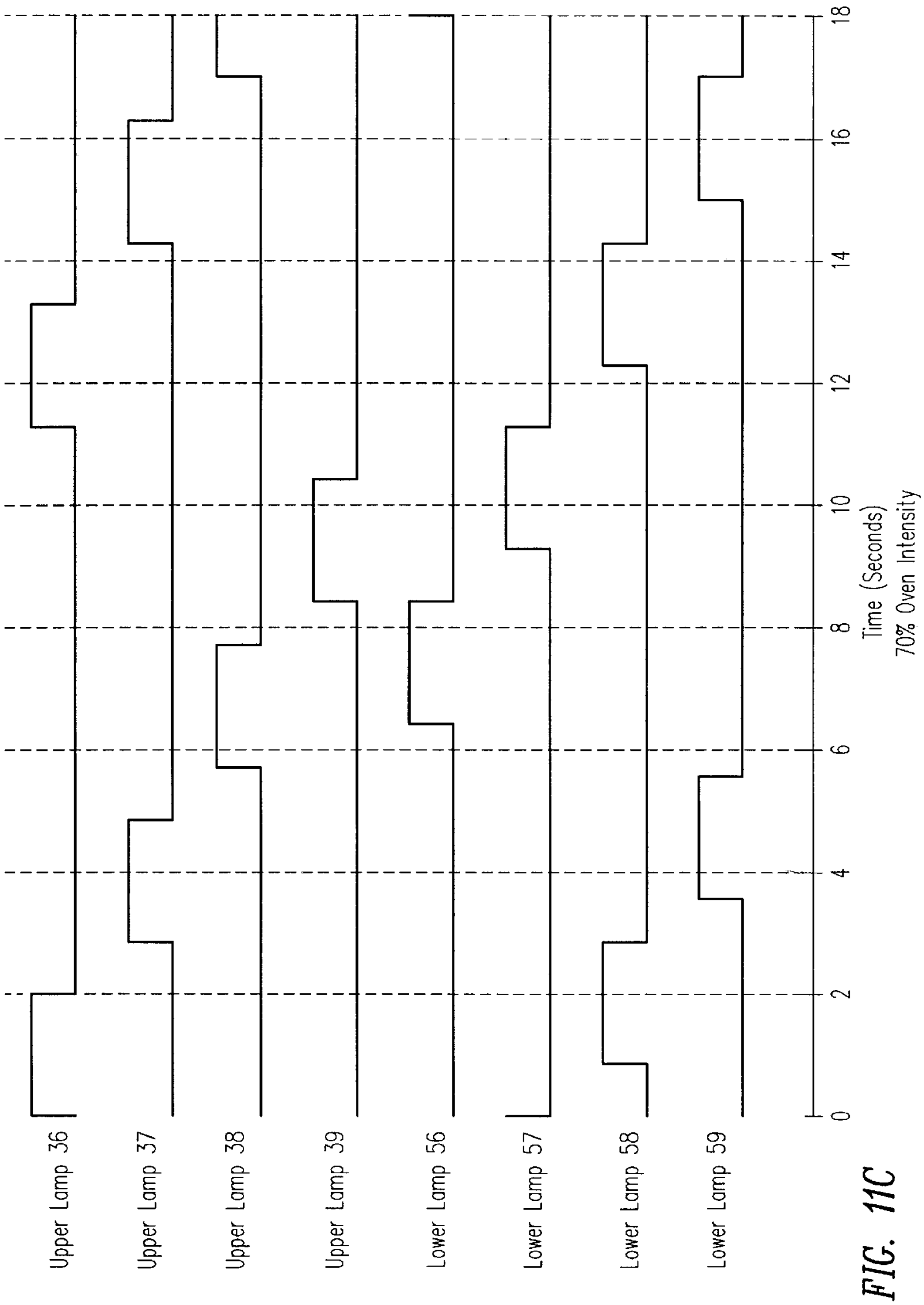
FIG. 11C is a graph showing the sequential lamp activation times for the cook mode of operation with a reduced oven intensity of 70%.
Figure 11D:
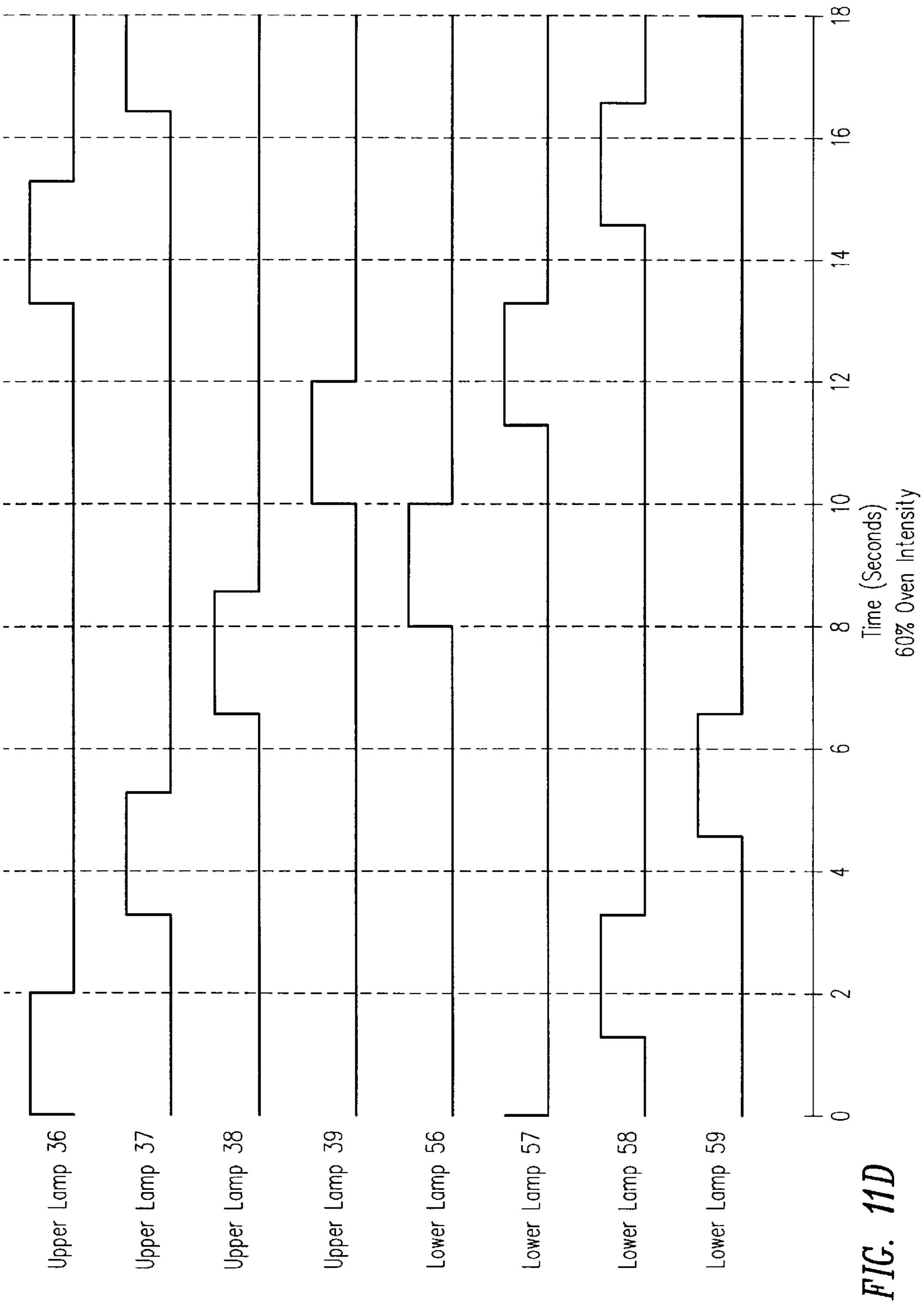
FIG. 11D is a graph showing the sequential lamp activation times for the cook mode of operation with a reduced oven intensity of 60%.
Figure 11E:
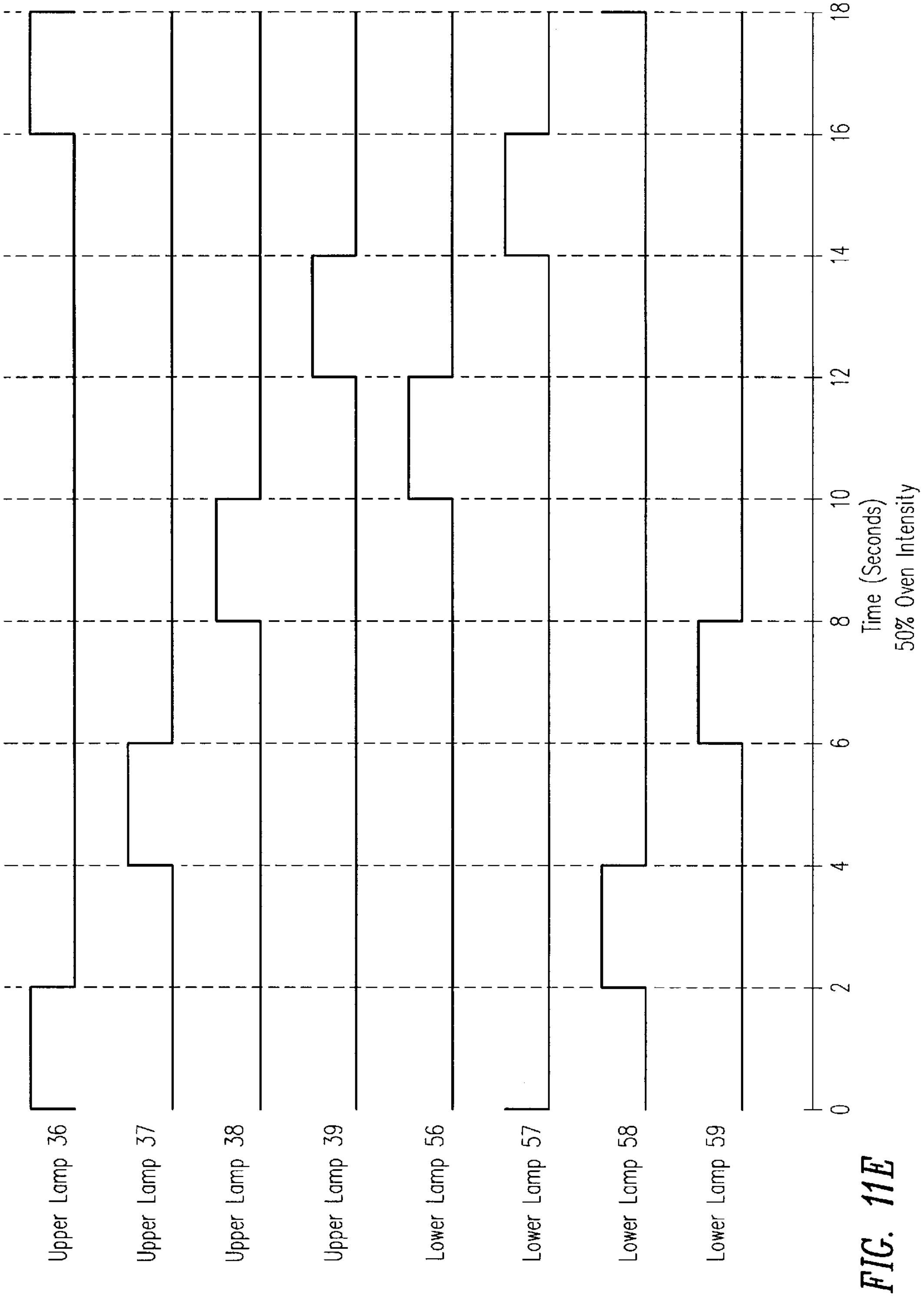
FIG. 11E is a graph showing the sequential lamp activation times for the cook mode of operation with a reduced oven intensity of 50%.

The duty cycle reduction feature of the present invention for reducing the (time) average power level of the upper lamps and the lower lamps is illustrated in FIG. 10 in the cook mode, however this feature is usable with any set of lamps in any mode of oven operation. The present invention reduces the oven intensity by adding a time delay $\Delta T$ between the shut down of one lamp and the turn on of the next consecutive lamp so that the lamps still operate at full power but operate with a reduced overall duty cycle. For example, the first upper/lower lamps 36/56 are turned on for 2 seconds and then off, and a time delay period $\Delta T$, such as 0.2 seconds, passes before the second upper/lower lamps 37/57 are turned on for two seconds and then off, and another 0.2 seconds pass before the third upper/lower lamps 38/58 are turned on, and so on with the fourth upper/lower lamps 39/59, for one or more cycles. In the above example, with the lamps operated for 2 seconds, separated by a time delay $\Delta T$ of 0.2 seconds, the overall time-average oven intensity (duty cycle) is about 91% of the full oven power intensity (duty cycle).

It is advantageous to have at least one of the lamps in the oven on at all times so the user can continuously view the cooking food. Therefore, the on/off cycles of the upper set of lamps 36–39 and lower set of lamps 56–59 can be staggered so that at least one lamp is on at all times for overall duty cycles as low as 50%. FIGS. 11A–11E illustrate 90%, 80%, 70%, 60% and 50% time-average oven intensity (reduced duty cycle) operation in cook mode respectively, which correspond to $\Delta T$ values of 0.22, 0.50, 0.86, 1.33 and 2.0 minutes respectively. The upper lamp cycle is shown staggered to the lower lamp cycle so that the cavity is continuously illuminated. The time delay $\Delta T$ can be different for the upper lamps 36–39 relative to the lower lamps 56–59. Thus, upper lamps 36–39 can operate at one time-average intensity (e.g. 80%) while lower lamps 56–59 can operate at a different time-average intensity (e.g. 60%). Thus, each lamp is operated at fully power, but by reducing the duty cycle as described above, the average power level of each lamp set can be reduced without adversely affecting the lamp spectrum.

A fifth mode of lamp operation is the defrost mode, which heats food without cooking. The defrost mode is the cook mode with a highly reduced oven intensity (duty cycle). For the present described oven, operating the oven at about 30% of full oven intensity (30% duty cycle) defrosts most foods with little or no cooking effect. Intermittent full lamp power is necessary to penetrate the food interior with visible light. However, full lamp power for an extended period of time will start cooking portions of the food.

Figure 12:
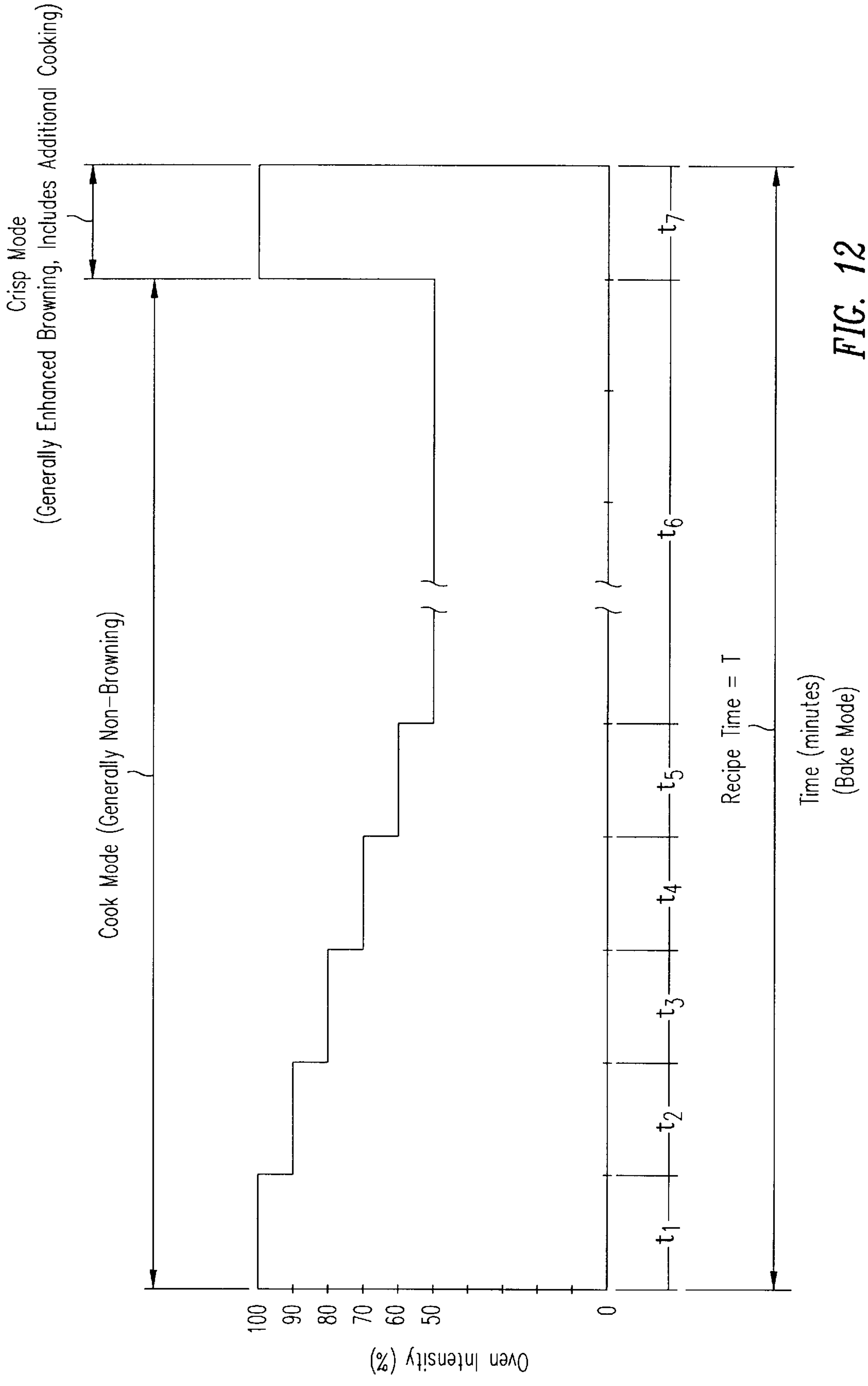
FIG. 12 is a graph showing the sequential lamp activation times of the present invention for the bake mode of operation.

A sixth mode of lamp operation is the bake mode, illustrated in FIG. 12. Baking of foods that have to rise as well as brown (i.e. pies, breads, cookies, cakes) requires that the food interior sufficiently cooks (reaches a certain peak temperature) and the food surface sufficiently browns. The method of baking in a conventional oven includes selecting an oven temperature and a bake time so that the food interior peak temperature and the ideal surface browning are achieved simultaneously at the end of the bake time. Thus, the cooking of the food interior and the browning of the food surface occur simultaneously. This baking process cannot be sped up by simply increasing the oven temperature because that would cause the browning to occur too soon, before the food interior is fully cooked.

Likewise, in the lightwave oven of the present invention, many foods have to be baked in cook mode using less than the full time-average oven intensity so that the food interior cooking and the food surface browning are completed at about the same time. If the oven power is too high, then water is prematurely driven off of the food surface, and the food surface browns and burns before the food interior can be fully cooked. An additional problem with baking food in cook mode is that there is no uniform translation between the baking time in a conventional oven and the baking time in a lightwave oven operating in cook mode. Some foods bake much faster in a lightwave oven compared to traditional oven recipes, while others bake only marginally faster. Therefore, traditional baking oven recipes are not that useful for estimating lightwave oven power and bake time in the cook mode.

The present inventors have developed the bake mode illustrated in FIG. 12 to solve the above mentioned problems. In bake mode, the lightwave oven combines varying cooking intensities in the cook mode with high intensity browning in the crisp mode to bake food. Bake mode essentially cooks the interior of the food first, and browns the food surface mostly at the end of the baking cycle. In bake mode, the oven initially operates at 100% oven intensity for a predetermined time period $t_1$. During this initial time period, very little surface browning occurs because the food starts out cold with plenty of food surface moisture. As the food bakes, lower oven intensities are required to prevent food surface browning (which would prevent visible and near-visible light penetration needed to cook the food's interior). Therefore, after time period $t_1$ expires, the time-average oven intensity is reduced to 90%, for a time period $t_2$, and then to 80% oven intensity for time period $t_3$, and then to 70% oven intensity for time period $t_4$, and then to 60% oven intensity for time period $t_5$, and then to 50% oven intensity for time period $t_6$. The food interior continues to cook at the reduced oven intensities without significant food surface browning. Once the food interior has nearly reached its peak temperature (fully cooked), high oven intensity (100%) is used for a time period $t_7$ to brown the food's surface (and finish the interior cooking of the food). Ideally, the cook mode (upper and lower lamps) is used during time intervals $t_1$ to $t_6$ for even cooking of the food's interior, and crisp mode (upper lamps only) is used during time interval $t_7$ to brown the food's surface from above. This bake mode operation of the present lightwave oven produces high quality baked goods in much less time than a conventional oven.

It has also been discovered that the bake mode operation described above provides an effective translation between conventional oven recipes (which are well known for most foods) and the total bake mode time T (which is $t_1$ to $t_7$) for the lightwave oven. More specifically, a single formula for the time values $t_1$ to $t_7$ in bake mode can be used to bake most foodstuffs in a lightwave oven having a known maximum power density, where the only variable is the conventional oven baking time. Therefore, the user need only enter into the lightwave oven a bake mode time T that is a certain fraction of the conventional oven bake time, and the oven will automatically bake the food in bake mode.

For example, for the 1.8 KW lightwave oven described herein, which produces a maximum power density of about 0.7 W/cm$^2$, it has been determined that the following formula in bake mode quickly bakes most foodstuffs and produces a high quality baked food product:

$$t_1 \text{ through } t_5 \text{ each} = 1 \text{ minute},$$

$$t_6 = T - 6 \text{ minutes},$$

$$t_7 = 1 \text{ minute, and}$$

$$T = \frac{\text{conventional oven baking time}}{2},$$

where T is the total lightwave cooking time. This formula would change for lightwave ovens having a higher or lower maximum power density, and can also vary depending upon cavity size, overall oven cavity reflectivity, oven cavity wall materials, and the type and color temperature of the lamps used. It should also be noted that the conventional oven baking temperature need not be factored into the formula for bake mode operation. This formula works exceptionally well for foods with conventional baking times greater than about 14 minutes. For conventional bake times of less than 14 minutes, T is not long enough to execute all time periods $t_1$ through $t_7$. However, the above formula still works well for conventional bakes times less than 14 minutes, where the bake sequence completes as many of the time periods $t_1$ through $t_6$ as possible in time T so that the bake sequence can skip to and end with full crisping ($t_7$).

The use of the above formula is a tremendous advantage for those users who only know the conventional baking recipe for a given foodstuff (e.g. from the food's packaging). The user can simply enter in the conventional baking time using operation keys 16, and the controller 9 will calculate the time values $t_1$ to $t_7$. Alternately, if the time conversion is easy (e.g. the one half value for the 1.8 KW oven), the user can input the appropriate bake mode time T that is a certain percentage (e.g. one half) of the known conventional oven baking time, and the controller 9 will calculate the time values $t_1$ to $t_7$.

It should be noted that other bake formulas that vary the time in one or more of the time periods or even skip one or more time periods have also been shown to bake foodstuffs with quality results. For example, the following formula has been successfully used to bake food:

$$t_1 = 1 \text{ minute},$$

$$t_2 = 1 \text{ minute},$$

$$t_3 = 2 \text{ minute},$$

$$t_4 = 3 \text{ minute},$$

$$t_5 = T - 8 \text{ minutes},$$

-continued $t_7 = 1$ minute, and $$T = \frac{\text{conventional oven baking time}}{2},$$

where the 80% and 70% intensity time periods ($t_3$,$t_4$) are increased, and the 50% intensity time period ($t_6$) is eliminated.

There are certain foods that may need a little more or a little less browning time than called for in the bake formula used by the lightwave oven. For these foods, the user need only visually monitor the lightwave bake mode operation during the last time interval $t_7$. If browning is completed before time interval $t_7$ expires, the user can simply stop the bake mode operation. If browning was not completed by the bake mode operation, then crisp mode can be activated to further brown the food as needed. The controller 9 can be programmed to sound an audible warning that indicates when the browning interval ($t_7$) begins, or after a certain portion of the browning interval has been completed, so the user can be alerted to visually monitor the baking food.

A cook mode formula has also been developed based upon the discovery that for many foods, such as meats and pizza, the final cooked foodstuff quality is improved if a cooking sequence using cook mode is concluded in the crisp mode. The added browning effect improves most foods cooked in cook mode, while other foods that do not need any extra browning are not adversely affected. The cook mode formula simply calls for the cooking mode to be switched from cook mode to crisp mode for the last few minutes of the cooking sequence. The actual time $t_c$ that the cook mode is converted to the crisp mode varies depending on the overall cook time T of the cooking sequence, as illustrated below:

For T=under 10 minutes, $t_c$ should be 2 minutes.

For T=10–20 minutes, $t_c$ should be 4 minutes.

For T=20–30 minutes, $t_c$ should be 6 minutes.

For T=30–60 minutes, $t_c$ should be 8 minutes.

For T=greater than 60 minutes, $t_c$ should be 10 minutes. Therefore, as an example, a foodstuff that normally cooks well in cook mode in 40 minutes, will cook better by being cooked in cook mode for 32 minutes followed by the crisp mode for 8 minutes. It should be noted that the cook mode formula also varies depending upon higher/lower maximum power densities, cavity size, overall oven cavity reflectivity, oven cavity wall materials, and the type and color temperature of the lamps used.

The above described oven, with two 1 KW, 120 VAC lamps operating at about 1.8 KW and around 2900° K produces a maximum time-average power density of about 0.7 W/cm$^2$. This power density cooks food about twice as fast as a conventional oven, with excellent browning. However, it should be noted that the above described oven could be operated to produce as little as about 0.35 to 0.40 W/cm$^2$ average power density and still outperform the cooking speed of a conventional oven. This lower power density can be achieved with reduced the oven intensity by reducing the duty cycle of the lamps, or by lowering the full operating power of the lamps below about 1.8 KW. However, if the lamp power is reduced too much, thus significantly reducing the color temperature of the lamps, then there will not be enough visible and near-visible light from the lamps to cook efficiently and produce high quality results.

It is also within the scope of the present invention to change the color temperature of the lamps, thus increasing the percentage of infrared radiation, emitted in any part of the cooking cycle. For example, for a different crisping effect in crisp mode, three upper lamps could be activated with a total power of 1.8 KW. Each lamp would run well below the 2900 ° K color temperature that two full power lamps operate, thus emitting relatively less visible and near-visible light. An extreme example of this concept is the warm mode, where all the lamps operate at a very low power, and thus mostly producing infrared radiation that keeps the food warm without cooking its interior.

The oven of the present invention may also be used cooperatively with other cooking sources. For example, the oven of the present invention may include a microwave radiation source 170. Such an oven would be ideal for cooking a thick highly absorbing food item such as roast beef. The microwave radiation would be used to help cook the interior portions of the meat and the infra-red, near-visible and visible light radiation of the present invention would cook and brown the outer portions.

Lastly, the different cooking modes of operation are ideal for any lightwave oven that sequentially operates lamps above and below the foodstuff in a staggered manner such that not all of the lamps above/below the food are on at the same time, whether only two of eight lamps are operated at once, or more than two lamps are operated simultaneously if the requisite electrical power is available. Thus, if sufficient power is available, the operation of, for example, the upper lamps can be staggered such that a second and/or third lamp can be activated before the first lamp is turned off. Thus, the stagger of the lamp operation of either the upper or lower lamps is a function of the overlap or delay between one lamp being turned off and other lamps being turned on (including turning two or more lamps on and off simultaneously such as in the grill and crisp modes), as well as how long each lamp is left turned on and turned off. The stagger of each lamp set dictates the overall average power level of that lamp set.

It is to be understood that the present invention is not limited to the embodiments described above and illustrated herein, but encompasses any and all variations falling within the scope of the appended claims. For example, it is within the scope of the present invention to: use sequential lamp operation including the above described modes of operation in any lightwave oven cavity design that has pluralities of lamps positioned above and below the cooking region, use a different number of lamps and reflecting channels (e.g. 3 lamps above and 3 lamps below with reflecting channels at 120 degrees to each other), use a non-cylindrically shaped sidewall which has approximately equivalent reflective properties of a cylinder, use lamps with different upper voltage and/or wattage ratings than the 1 KW and 120 V ratings described above, use reflector assemblies having a shape or size that do not exactly match the shape/size of the oven cavity sidewall, gradually change the oven intensity (lamp duty cycle) and/or lamp powers instead of the step-wise changes illustrated in the figures, activate more or fewer lamps at any given time, change the on/off times and the duty cycles and powers of the lamps individually and/or collectively for any part of the operating modes listed above, operate with greater or fewer than two lamps on at any given time, design the oven cavity and lamp configurations for full lamp 30 operation above or below the 1.8 KW oven capacity discussed above, and interleave the stagger patterns of the upper lamps and lower lamps so that the relative number of upper lamps versus lower lamps that are on at any given time varies during the cooking sequence.

What is claimed is:

1. A method of cooking food in a lightwave oven having a cooking region and a first plurality of high power lamps positioned above the cooking region and a second plurality of high power lamps positioned below the cooking region providing radiant energy in the electromagnetic spectrum including the infrared, near-visible and visible ranges, comprising the steps of:

sequentially operating one of the first and second pluralities of lamps at a first average power level by applying power thereto in a staggered manner so that not all of the lamps of the one plurality of lamps are on at the same time; and sequentially operating the other one of the first and second pluralities of lamps at a second average power level by applying power thereto in a staggered manner so that not all of the lamps of the other one plurality of lamps are on at the same time;

wherein for at least a predetermined time, the sequential operations of the first and second pluralities of lamps are not performed simultaneously, so that the first plurality of lamps are turned off during the sequential operation of the second plurality of lamps, and the second plurality of lamps are turned off during the sequential operation of the first plurality of lamps.

2. The method of claim 1 wherein during the non-simultaneous sequential operations of the first and second pluralities of lamps, no more than one of the first plurality of lamps and one of the second plurality of lamps are on at the same time.

3. The method of claim 1 wherein during the non-simultaneous sequential operations of the first and second pluralities of lamps, at least one lamp of the first and second pluralities of lamps is on at any given time.

4. The method of claim 1, further comprising the step of:

varying the stagger of the sequential operation of at least one of the first plurality of lamps and the second plurality of lamps to change the average power level thereof.

5. The method of claim 1, further comprising the steps of:

varying the stagger of the sequential operation of the first plurality of lamps to change the average power level thereof, and varying the stagger of the sequential operation of the second plurality of lamps to change the average power level thereof.

6. The method of claim 1 further comprising the steps of:

ceasing the operation of the first plurality of lamps; and varying the stagger of the sequential operation of the second plurality of lamps to increase the average power level thereof.

7. The method of claim 1, wherein the first average power level does not equal the second average power level.

8. A method of cooking food in a lightwave oven having a cooking region and a first plurality of high power lamps positioned above the cooking region and a second plurality of high power lamps positioned below the cooking region providing radiant energy in the electromagnetic spectrum including the infrared, near-visible and visible ranges, comprising the steps of:

sequentially operating one of the first and second pluralities of lamps at a first average power level by applying power thereto in a staggered manner so that not all of the lamps of the one plurality of lamps are on at the same time;

sequentially operating the other one of the first and second pluralities of lamps at a second average power level by applying power thereto in a staggered manner so that not all of the lamps of the other one plurality of lamps are on at the same time, wherein the sequential operations of the first and second pluralities of lamps are performed simultaneously;

ceasing the operation of the second plurality of lamps; and varying the stagger of the sequential operation of the first plurality of lamps to increase the average power level thereof.

9. A method of cooking food in a lightwave oven having a cooking region and a first plurality of high power lamps positioned above the cooking region and a second plurality of high power lamps positioned below the cooking region providing radiant energy in the electromagnetic spectrum including the infrared, near-visible and visible ranges, comprising the steps of:

sequentially operating one of the first and second pluralities of lamps at a first average power level by applying power thereto in a staggered manner so that not all of the lamps of the one plurality of lamps are on at the same time;

sequentially operating the other one of the first and second pluralities of lamps at a second average power level by applying power thereto in a staggered manner so that not all of the lamps of the other one plurality of lamps are on at the same time, wherein the sequential operations of the first and second pluralities of lamps are performed simultaneously;

repeatedly varying the stagger of at least one of the sequential operations of the first plurality of lamps and the second plurality of lamps to repeatedly reduce the average power level thereof, and then ceasing the operation of the second plurality of lamps and varying the stagger of the sequential operation of the first plurality of lamps to increase the average power level thereof.

10. The method of claim 9 further comprising the step of:

activating an audible alarm when the ceasing step is performed.

11. A lightwave oven comprising:

an oven cavity housing enclosing a cooking region therein;

a first plurality and a second plurality of high power lamps that provide radiant energy in the visible, near-visible and infrared ranges of the electromagnetic spectrum, wherein the first plurality of lamps are positioned above the cooking region and the second plurality of lamps are positioned below the cooking region; and a controller that sequentially operates the first plurality of lamps at a first average power level by applying power thereto in a staggered manner so that not all of the first plurality of lamps are on at the same time, and that sequentially operates the second plurality of lamps at a second average power level by applying power thereto in a staggered manner so that not all of the second plurality of lamps are on at the same time;

wherein, for at least a predetermined time, the controller controls the sequential operations of both the first and second pluralities of lamps to run non-simultaneously with each other, such that the first plurality of lamps are turned off during the sequential operation of the second plurality of lamps, and the second plurality of lamps are turned off during the sequential operation of the first plurality of lamps.

12. The lightwave oven of claim 11 wherein during the non-simultaneous sequential operations of the first and second pluralities of lamps, no more than one of the first plurality of lamps and one of the second plurality of lamps are on at the same time.

13. The lightwave oven of claim 11 wherein during the non-simultaneous sequential operations of the first and second pluralities of lamps, at least one lamp of the first and second pluralities of lamps is on at any given time.

14. The lightwave oven of claim 11, wherein the controller varies the stagger of the sequential operation of at least one of the first plurality of lamps and the second plurality of lamps to change the average power level thereof.

15. The lightwave oven of claim 11, wherein:

the controller varies the stagger of the sequential operation of the first plurality of lamps to change the first average power level, and the controller varies the stagger of the sequential operation of the second plurality of lamps to change the second average power level.

16. The lightwave oven of claim 11 wherein the first average power level does not equal the second average power level.

17. A lightwave oven comprising:

an oven cavity housing enclosing a cooking region therein;

a first plurality and a second plurality of high power lamps that provide radiant energy in the visible, near-visible and infrared ranges of the electromagnetic spectrum, wherein the first plurality of lamps are positioned above the cooking region and the second plurality of lamps are positioned below the cooking region; and a controller that sequentially operates the first plurality of lamps at a first average power level by applying power thereto in a staggered manner so that not all of the first plurality of lamps are on at the same time, and that sequentially operates the second plurality of lamps at a second average power level by applying power thereto in a staggered manner so that not all of the second plurality of lamps are on at the same time;

wherein the controller controls both the sequential operations of the first and second pluralities of lamps to run simultaneously, and wherein the controller ceases the operation of the second plurality of lamps, and varies the stagger of the sequential operation of the first plurality of lamps to increase the first power level.

18. A lightwave oven comprising:

an oven cavity housing enclosing a cooking region therein;

a first plurality and a second plurality of high power lamps that provide radiant energy in the visible, near-visible and infrared ranges of the electromagnetic spectrum, wherein the first plurality of lamps are positioned above the cooking region and the second plurality of lamps are positioned below the cooking region; and a controller that sequentially operates the first plurality of lamps at a first average power level by applying power thereto in a staggered manner so that not all of the first plurality of lamps are on at the same time, and that sequentially operates the second plurality of lamps at a second average power level by applying power thereto in a staggered manner so that not all of the second plurality of lamps are on at the same time;

wherein the controller controls both the sequential operations of the first and second pluralities of lamps to run simultaneously, and wherein the controller ceases the operation of the first plurality of lamps, and varies the stagger of the sequential operation of the second plurality of lamps to increase the second power level.

19. A lightwave oven comprising:

an oven cavity housing enclosing a cooking region therein;

a first plurality and a second plurality of high power lamps that provide radiant energy in the visible, near-visible and infrared ranges of the electromagnetic spectrum, wherein the first plurality of lamps are positioned above the cooking region and the second plurality of lamps are positioned below the cooking region; and a controller that sequentially operates the first plurality of lamps at a first average power level by applying power thereto in a staggered manner so that not all of the first plurality of lamps are on at the same time, and that sequentially operates the second plurality of lamps at a second average power level by applying power thereto in a staggered manner so that not all of the second plurality of lamps are on at the same time;

wherein the controller controls both the sequential operations of the first and second pluralities of lamps to run simultaneously, and wherein the controller repeatedly varies the stagger of at least one of the sequential operations of the first plurality of lamps and the second plurality of lamps to repeatedly reduce the average power level thereof, and then ceases the operation of the second plurality of lamps and varies the stagger of the sequential operation of the first plurality of lamps to increase the first average power level.

20. The lightwave oven of claim 19 further comprising:

an audible alarm that is activated when the ceasing of operation of the second plurality of lamps is performed.

21. A lightwave oven, comprising:

an oven cavity housing enclosing a cooking region therein;

a first plurality and a second plurality of high power lamps that provide radiant energy in the visible, near-visible and infrared ranges of the electromagnetic spectrum, wherein the first plurality of lamps are positioned above the cooking region and the second plurality of lamps are positioned below the cooking region; and a controller that sequentially operates the first plurality of lamps at a first average power level by applying power thereto in a staggered manner so that not all of the first plurality of lamps are on at the same time, and that sequentially operates the second plurality of lamps at a second average power level by applying power thereto in a staggered manner so that not all of the second plurality of lamps are on at the same time;

wherein the controller selectively controls the first and second plurality of lamps in a plurality of modes that include:

a first mode, where the first and second pluralities of lamps are operated simultaneously while each of the first and second plurality of lamps are operated sequentially;

a second mode, where the first plurality of lamps is sequentially operated while the second plurality of lamps are turned off; and a third mode, where the second plurality of lamps is sequentially operated while the first plurality of lamps are turned off.

22. A lightwave oven comprising:

an oven cavity housing enclosing a cooking region therein;

a first plurality and a second plurality of high power lamps that provide radiant energy in the visible, near-visible and infrared ranges of the electromagnetic spectrums, wherein the first plurality of lamps are positioned above the cooking region and the second plurality of lamps are positioned below the cooking region;

a controller that sequentially operates the first plurality of lamps at a first average power level by applying power thereto in a staggered manner so that not all of the first plurality of lamps are on at the same time, and that sequentially operates the second plurality of lamps at a second average power level by applying power thereto in a staggered manner so that not all of the second plurality of lamps are on at the same time;

means for entering conventional oven recipe information; and means for calculating a lightwave oven cooking time and sequential operation stagger values for the sequential operations of the first and second pluralities of lamps based upon the entered conventional oven recipe information;

wherein the controller controls the sequential operations of the first and second pluralities of lamps based upon the calculated cooking time and stagger values.

* * * * *